US012675829B1

(12) United States Patent
Renfroe et al.

(10) Patent No.: US 12,675,829 B1
(45) Date of Patent: Jul. 7, 2026

(54) COMPUTER-IMPLEMENTED METHOD AND SYSTEM FOR ANALYSIS AND VALIDATION OF CONSISTENCY ACROSS DOCUMENTS INCLUDING IMAGES AND LANGUAGE DATA USING ARTIFICIAL INTELLIGENCE (AI)

(71) Applicant: RENFROE, Birmingham, AL (US)

(72) Inventors: Gavon A Renfroe, Austin, TX (US);
Roy Stubbs, Brimingham, AL (US);
Edward Mwanza, St Clair, MO (US);
Ayodeji Fajebe, Woodstock, GA (US)

(73) Assignee: RENFROE

( * ) Notice: Subject to any disclaimer, the term of this patent is extended or adjusted under 35 U.S.C. 154(b) by 0 days.

(21) Appl. No.: 19/411,086

(22) Filed: Dec. 5, 2025

Related U.S. Application Data

(60) Provisional application No. 63/742,385, filed on Jan. 6, 2025.

(51) Int. Cl.
*G06Q 40/08* (2012.01)
*G06F 40/40* (2020.01)
(Continued)

(52) U.S. Cl.
CPC ............. *G06Q 40/09* (2025.08); *G06F 40/40* (2020.01); *G06Q 40/0841* (2025.08); *G06T 11/60* (2013.01); *G06V 10/761* (2022.01); *G06V 10/774* (2022.01); *G06V 10/776* (2022.01); *G06V 20/50* (2022.01); *G06V 20/70* (2022.01)

(58) Field of Classification Search
CPC .... G06Q 40/09; G06Q 40/0841; G06F 40/40; G06T 11/60; G06V 10/761; G06V 10/774; G06V 10/776; G06V 20/50
See application file for complete search history.

(56) References Cited

U.S. PATENT DOCUMENTS 10,635,903 B1 * 4/2020 Harvey .................. G06Q 40/08
11,514,526 B1 * 11/2022 Kwartler ............... G06V 10/82
(Continued)

FOREIGN PATENT DOCUMENTS

WO WO-2023006974 A1 * 2/2023 ........... G06F 18/214

*Primary Examiner* — Scott S Trotter
(74) *Attorney, Agent, or Firm* — Conley Rose, P.C.

(57) ABSTRACT

A computer-implemented method provides AI-driven quality assurance (QA) on damage claims through consistency checks across claims data at different processing stages and against policy, regulation, and guideline information. An AI-based claims QA agent receives claims data comprising a photo document, a claim document, and a reference document for a damaged property. The agent extracts images and a textual description from the photo document, processes the images using a computer vision model to extract first damage information, and processes the textual description using a machine learning (ML) model to extract second damage information. The agent validates accuracy of the photo document based on consistency between the first and second damage information, combines that information into third damage information, and validates accuracy of the claim document against contextual information from the reference document and the third damage information. A large-language model (LLM) generates a QA report identifying issues, initiating corrective updates.

14 Claims, 16 Drawing Sheets

(51) Int. Cl.

| | |
|---|---|
| *G06T 11/60* | (2026.01) |
| *G06V 10/74* | (2022.01) |
| *G06V 10/774* | (2022.01) |
| *G06V 10/776* | (2022.01) |
| *G06V 20/50* | (2022.01) |
| *G06V 20/70* | (2022.01) |

(56) References Cited

U.S. PATENT DOCUMENTS

| | | | | |
|---|---|---|---|---|
| 11,836,803 | B1 * | 12/2023 | Allerkamp | G06N 20/00 |
| 12,118,779 | B1 * | 10/2024 | Hu | G06V 10/774 |
| 12,354,250 | B1 * | 7/2025 | McKinney | G06T 7/0002 |
| 12,482,231 | B2 * | 11/2025 | Uziel | G06V 10/764 |
| 2022/0044256 | A1 * | 2/2022 | Lakshminarayanan | |
| | | | | G06Q 10/20 |
| 2024/0303795 | A1 * | 9/2024 | Lovings | G06T 7/0002 |

* cited by examiner

500

First Consistency Check Result 242 —————————————▶

Second Consistency Check Result 272 ————————————▶          LLM 510

Input Prompt 502          ————————————▶

QA Report
282

Preprocessed
Text Data 232

(from Reference Document 114)

700

800

900

900

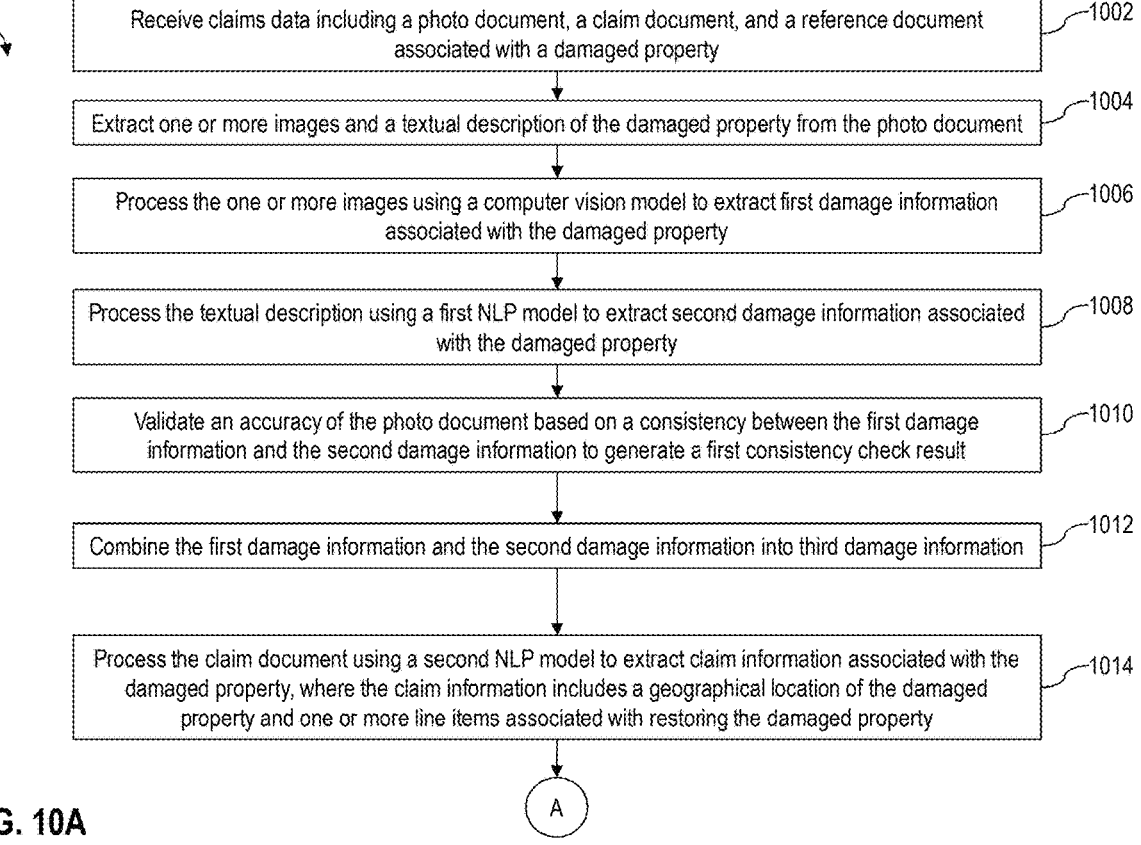

1000

Receive claims data including a photo document, a claim document, and a reference document associated with a damaged property ⟋1002

Extract one or more images and a textual description of the damaged property from the photo document ⟋1004

Process the one or more images using a computer vision model to extract first damage information associated with the damaged property ⟋1006

Process the textual description using a first NLP model to extract second damage information associated with the damaged property ⟋1008

Validate an accuracy of the photo document based on a consistency between the first damage information and the second damage information to generate a first consistency check result ⟋1010

Combine the first damage information and the second damage information into third damage information ⟋1012

Process the claim document using a second NLP model to extract claim information associated with the damaged property, where the claim information includes a geographical location of the damaged property and one or more line items associated with restoring the damaged property ⟋1014

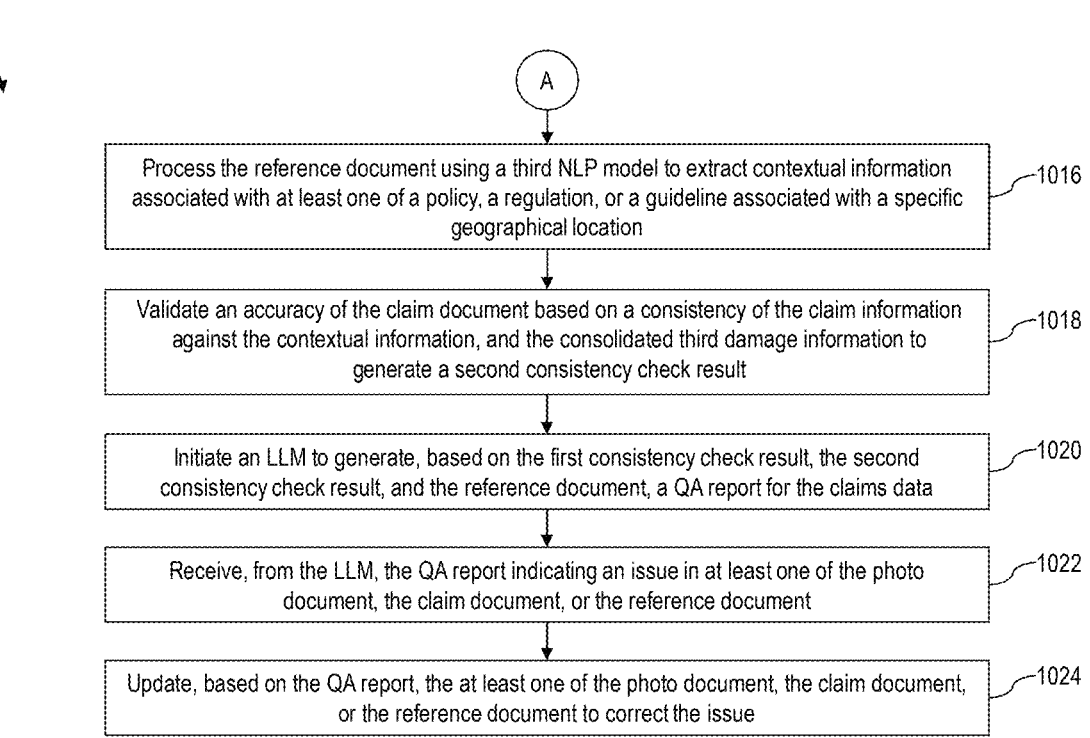

A

| Process the reference document using a third NLP model to extract contextual information associated with at least one of a policy, a regulation, or a guideline associated with a specific geographical location | 1016 |

| Validate an accuracy of the claim document based on a consistency of the claim information against the contextual information, and the consolidated third damage information to generate a second consistency check result | 1018 |

| Initiate an LLM to generate, based on the first consistency check result, the second consistency check result, and the reference document, a QA report for the claims data | 1020 |

| Receive, from the LLM, the QA report indicating an issue in at least one of the photo document, the claim document, or the reference document | 1022 |

| Update, based on the QA report, the at least one of the photo document, the claim document, or the reference document to correct the issue | 1024 |

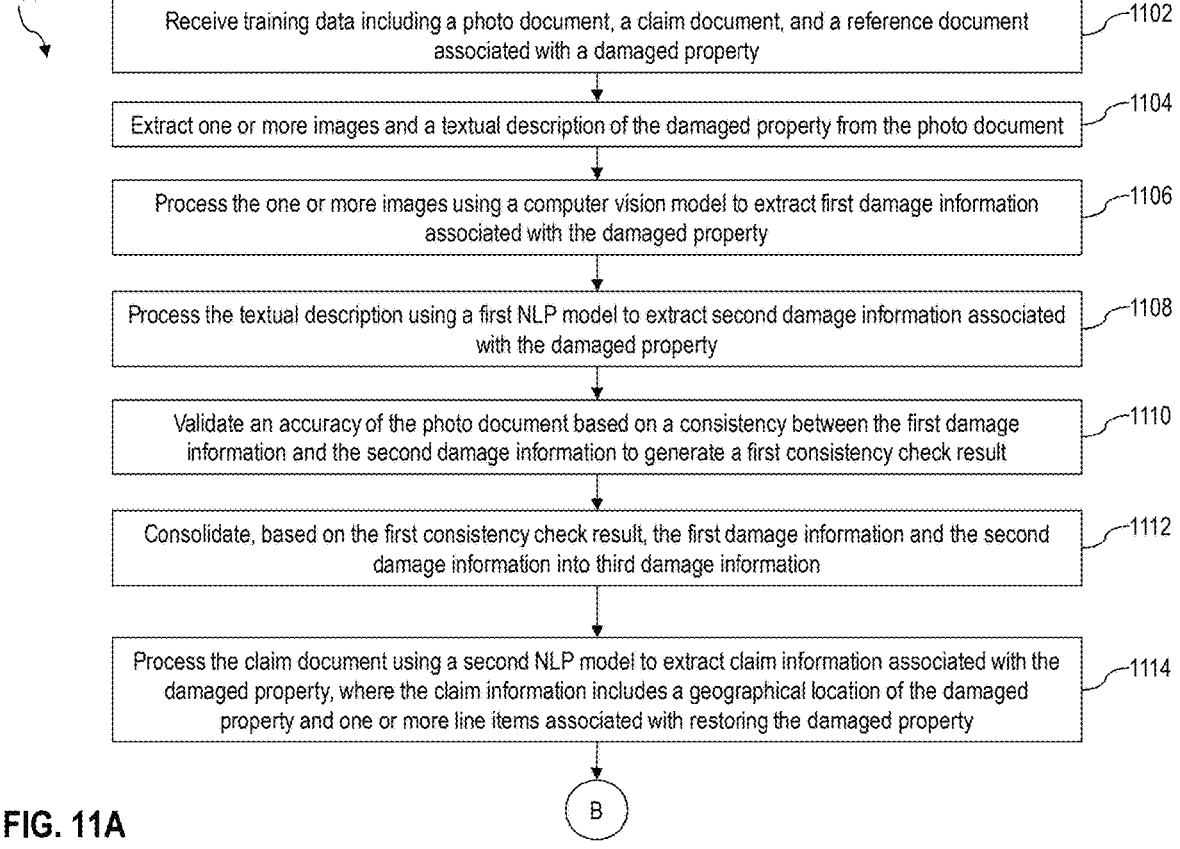

Receive training data including a photo document, a claim document, and a reference document associated with a damaged property ⟋1102

Extract one or more images and a textual description of the damaged property from the photo document ⟋1104

Process the one or more images using a computer vision model to extract first damage information associated with the damaged property ⟋1106

Process the textual description using a first NLP model to extract second damage information associated with the damaged property ⟋1108

Validate an accuracy of the photo document based on a consistency between the first damage information and the second damage information to generate a first consistency check result ⟋1110

Consolidate, based on the first consistency check result, the first damage information and the second damage information into third damage information ⟋1112

Process the claim document using a second NLP model to extract claim information associated with the damaged property, where the claim information includes a geographical location of the damaged property and one or more line items associated with restoring the damaged property ⟋1114

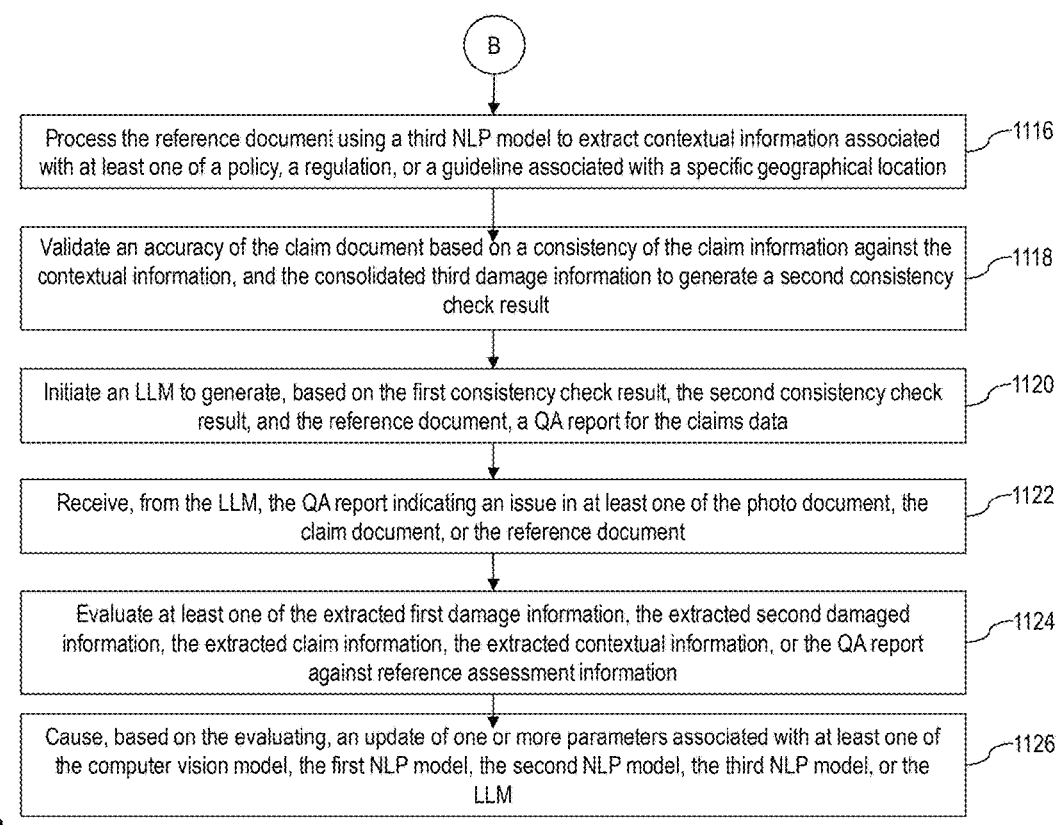

B

Process the reference document using a third NLP model to extract contextual information associated with at least one of a policy, a regulation, or a guideline associated with a specific geographical location          1116

Validate an accuracy of the claim document based on a consistency of the claim information against the contextual information, and the consolidated third damage information to generate a second consistency check result          1118

Initiate an LLM to generate, based on the first consistency check result, the second consistency check result, and the reference document, a QA report for the claims data          1120

Receive, from the LLM, the QA report indicating an issue in at least one of the photo document, the claim document, or the reference document          1122

Evaluate at least one of the extracted first damage information, the extracted second damaged information, the extracted claim information, the extracted contextual information, or the QA report against reference assessment information          1124

Cause, based on the evaluating, an update of one or more parameters associated with at least one of the computer vision model, the first NLP model, the second NLP model, the third NLP model, or the LLM          1126

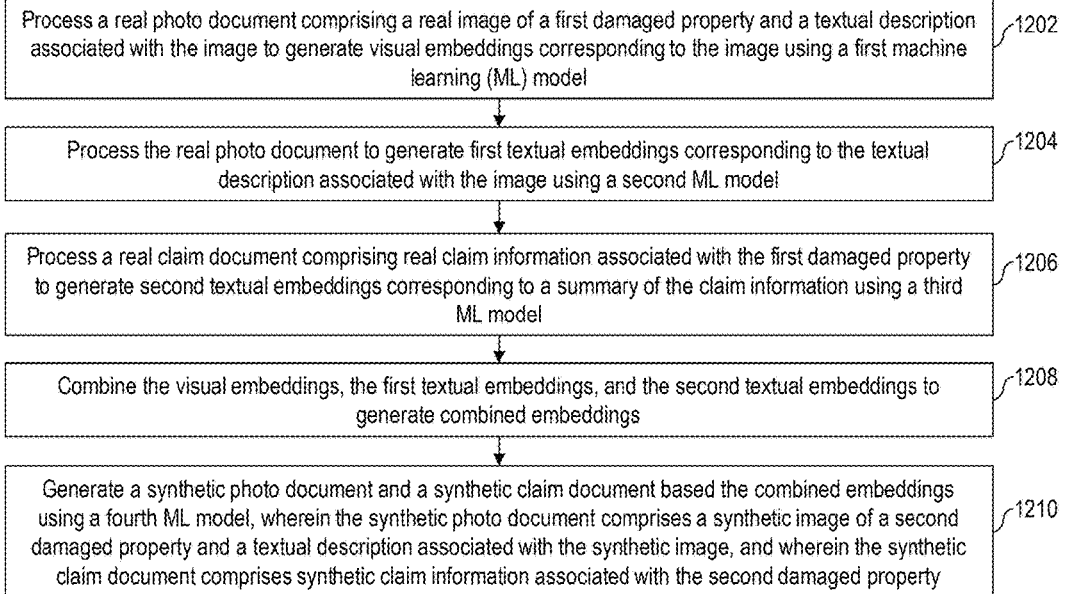

Process a real photo document comprising a real image of a first damaged property and a textual description associated with the image to generate visual embeddings corresponding to the image using a first machine learning (ML) model ⟋1202

Process the real photo document to generate first textual embeddings corresponding to the textual description associated with the image using a second ML model ⟋1204

Process a real claim document comprising real claim information associated with the first damaged property to generate second textual embeddings corresponding to a summary of the claim information using a third ML model ⟋1206

Combine the visual embeddings, the first textual embeddings, and the second textual embeddings to generate combined embeddings ⟋1208

Generate a synthetic photo document and a synthetic claim document based the combined embeddings using a fourth ML model, wherein the synthetic photo document comprises a synthetic image of a second damaged property and a textual description associated with the synthetic image, and wherein the synthetic claim document comprises synthetic claim information associated with the second damaged property ⟋1210

FIG. 12

COMPUTER-IMPLEMENTED METHOD AND SYSTEM FOR ANALYSIS AND VALIDATION OF CONSISTENCY ACROSS DOCUMENTS INCLUDING IMAGES AND LANGUAGE DATA USING ARTIFICIAL INTELLIGENCE (AI)

CROSS-REFERENCE TO RELATED APPLICATIONS

This application claims the benefit of U.S. Provisional Application No. 63/742,385, filed Jan. 6, 2025, the contents of which are incorporated herein by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Property owners may experience property damage resulting from weather related incidents such as storms, hurricanes, tornadoes, typhoons, earthquakes, hail, wind, lightning, or activities (e.g., water leak). To rectify a damaged property, the owner (e.g., a policyholder) of the property may file a claim with their property insurer. An insurance claim is a formal request to an insurance company for reimbursement for covered losses or damages. For instance, the property owner may call the insurance company, and the insurance company may dispatch a field adjuster to the property. The field adjuster may manually survey the damaged property, take pictures of the damaged area(s) (e.g., using cameras or drones), measure the damaged area(s), and take notes (e.g., by hand on paper or a mobile device) describing the type and/or the extent of the damage. Subsequently, the field adjuster may enter the pictures, measurements, and notes into a claims processing system. To process the claim, a claim adjuster may determine whether the damage was due to a cause covered by the insurance policy or contract and the amount that the insurer may pay on the claim. The workflow for a claim may generally involve multiple stages of processing by different adjusters at various time points. Thus, the claims workflow can be complex.

SUMMARY

In an embodiment, a computer-implemented method for generating synthetic claims data for training artificial intelligence (AI) models to perform consistency check across different documents including images and text is provided. The method includes processing, by an AI-based claims data generator including instructions stored in non-transitory memory of a computer system and executable by a processor of the computer system, a real photo document comprising a real image of a first damaged property and a textual description associated with the real image to generate visual embeddings corresponding to the real image using a first machine learning (ML) model; processing, by the AI-based claims data generator, the real photo document to generate first textual embeddings corresponding to the textual description associated with the real image using a second ML model; processing, by the AI-based claims data generator, a real claim document comprising real claim information associated with the first damaged property to generate second textual embeddings corresponding to a summary of the claim information using a third ML model; combining, by the AI-based claims data generator, the visual embeddings, the first textual embeddings, and the second textual embeddings to generate combined embeddings; and generating, by the AI-based claims data generator, a synthetic photo document and a synthetic claim document based on the combined embeddings using a fourth ML model, wherein the synthetic photo document comprises a synthetic image of a second damaged property and a textual description associated with the synthetic image, and wherein the synthetic claim document comprises synthetic claim information associated with the second damaged property.

In another embodiment, a computer-implemented method for providing efficient, systematic artificial intelligence (AI)-driven quality assurance (QA) assessment on damage claims based on an analysis and multiple consistency checks across claims data from different processing stages and against relevant policy, regulation, and guideline information is provided. The method includes receiving, by an AI-based claims QA agent including instructions stored in non-transitory memory of a computer system and executable by a processor of the computer system, claims data comprising a photo document, a claim document, and a reference document associated with a damaged property; extracting, by the AI-based claims QA agent, one or more images and a textual description of the damaged property from the photo document; processing, by the AI-based claims QA agent, the one or more images using a computer vision model to extract first damage information associated with the damaged property; processing, by the AI-based claims QA agent, the textual description using a first machine learning (ML) model to extract second damage information associated with the damaged property; validating, by the AI-based claims QA agent, an accuracy of the photo document based on a consistency between the first damage information and the second damage information to generate a first consistency check result; combining, by the AI-based claims QA agent, the first damage information and the second damage information into third damage information; processing, by the AI-based claims QA agent, the claim document using a second ML model to extract claim information associated with the damaged property, wherein the claim information comprises a geographical location of the damaged property and one or more line items associated with restoring the damaged property; processing, by the AI-based claims QA agent, the reference document using a third ML model to extract contextual information associated with at least one of a policy, a regulation, or a guideline associated with a specific geographical location; validating, by the AI-based claims QA agent, an accuracy of the claim document based on a consistency of the claim information against the contextual information, and the combined third damage information to generate a second consistency check result; initiating, by the AI-based claims QA agent, a large-language model (LLM) to generate, based on the first consistency check result, the second consistency check result, and the reference document, a QA report for the claims data; receiving, by the AI-based claims QA agent, from the LLM, the QA report indicating an issue in at least one of the photo document, the claim document, or the reference document; and updating, by the AI-based claims QA agent, based on the QA report, the at least one of the photo document, the claim document, or the reference document to correct the issue.

In yet another embodiment, a computer-implemented method for training an artificial intelligence (AI)-driven quality assurance (QA) model for validating data across different sources is provided. The method includes receiving, by an AI-based QA model trainer including instructions stored in non-transitory memory of a computer system and executable by a processor of the computer system, training data comprising a photo document, a claim document, and a reference document associated with a damaged property; extracting, by the AI-based QA model trainer, one or more images and a textual description of the damaged property from the photo document; processing, by the AI-based QA model trainer, the one or more images using a computer vision model to extract first damage information associated with the damaged property; processing, by the AI-based QA model trainer, the textual description using a first machine learning (ML) model to extract second damage information associated with the damaged property; validating, by the AI-based QA model trainer, an accuracy of the photo document based on a consistency between the first damage information and the second damage information to generate a first consistency check result; combining, by the AI-based QA model trainer, based on the first consistency check result, the first damage information and the second damage information into third damage information; processing, by the AI-based QA model trainer, the claim document using a second ML model to extract claim information associated with the damaged property, wherein the claim information comprises a geographical location of the damaged property and one or more line items associated with restoring the damaged property; processing, by the AI-based QA model trainer, the reference document using a third ML model to extract contextual information associated with at least one of a policy, a regulation, or a guideline associated with a specific geographical location; validating, by the AI-based QA model trainer, an accuracy of the claim document based on a consistency of the claim information against the claim document against the contextual information, and the combined third damage information to generate a second consistency check result; initiating, by the AI-based QA model trainer, a large-language model (LLM) to generate, based on the first consistency check result, the second consistency check result, and the reference document, a QA report for the training data; receiving, by the AI-based QA model trainer, from the LLM, the QA report indicating an issue in at least one of the photo document, the claim document, or the reference document; evaluating, by the AI-based QA model trainer, at least one of the extracted first damage information, the extracted second damaged information, the extracted claim information, the extracted contextual information, or the QA report against reference assessment information; and causing, by the AI-based QA model trainer, based on the evaluating, an update of one or more parameters associated with at least one of the computer vision model, the first ML model, the second ML model, the third ML model, or the LLM.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, where like reference numerals represent like parts.

FIGS. 10A and 10B are flow charts of a method according to an embodiment of the disclosure.

FIGS. 11A and 11B are flow charts of another method according to an embodiment of the disclosure.

FIG. 12 is a flow chart of yet another method according to an embodiment of the disclosure.

DETAILED DESCRIPTION

Figure 1:
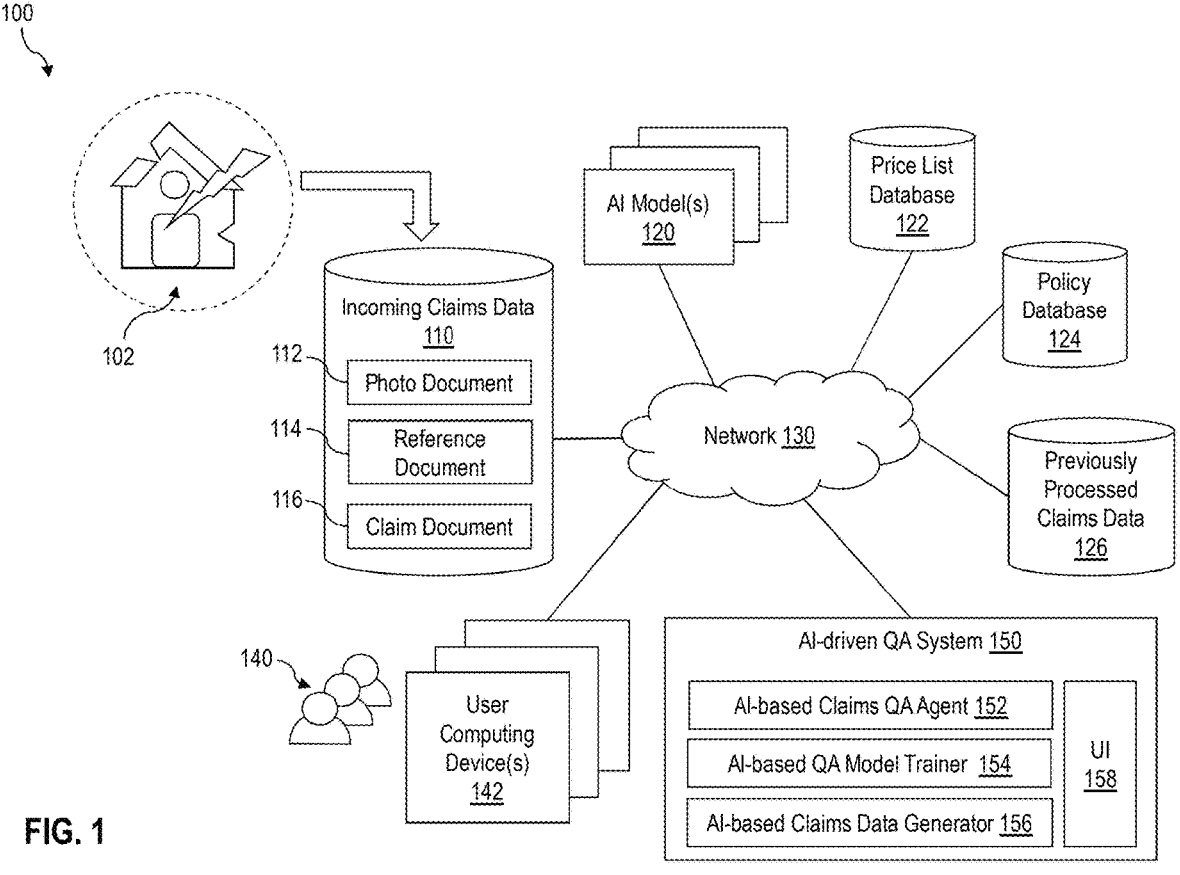
FIG. 1 is a block diagram of a network system that provides efficient, systematic artificial intelligence (AI)-driven quality assurance (QA) assessment for insurance claims data according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Quality assurance (QA) in insurance claims is a process that ensures claims are filed and handled efficiently, accurately, and in compliance with policies, regulations, and guidelines. Effective QA may maintain customer satisfaction, reduce operational risks, minimize fraud, and improve overall claim outcomes. Specifically, the accuracy of a filed claim is important so that the respective policyholder is properly indemnified.

As discussed above, an insurance claims workflow may include multiple processing stages, from the moment a policyholder files a claim to the final payout. A filed claim (registered with a claim processing system of an insurance company) may undergo a QA process before a payout may be made. The QA process is traditionally performed manually by human reviewers (e.g., claim adjustment experts). The manual QA process can be intensive and time-consuming. For example, it may take a human reviewer a few days (e.g., 2 to 3 days) to quality-check a filed claim, and thus may be extremely inefficient considering an insurance company may receive tens to hundreds of claims (if not more) in a month. Additionally, human reviewers can experience mental fatigue, resulting in inaccuracies and oversights. Further, there can be human bias when using human reviewers for the QA process. More importantly, due to the lack of scalability with using human reviewers for QA, most insurance companies may only quality-check about 10 percent (%) to 20% of their claims, with some checking fewer than 1% of their claims. The lack of QA on claims can be costly for the insurance companies and/or cause customer dissatisfaction (e.g., when inaccurate payouts are made).

The present disclosure provides a technical solution to the aforementioned technical problems in the technical field of QA for insurance claims data to provide an efficient, systematic AI-driven QA system for insurance claims data. For example, the system may utilize AI to perform QA (e.g., including analysis, interpretation, and QA report generation) on claim files. Claim files are documentations that record relevant information related to an insurance claim. For instance, claim files related to an insurance claim for a particular damaged property (e.g., a house or any building structure) may include photographs of the damaged property, description of the damage (for claiming purposes), estimates of services, repairs, and/or replacements for restoring the damaged property. The system may analyze the content (body of information) of the claim files and determine the accuracy of the claim files. For instance, the system may determine whether the photographs, the description, and the cost estimates are consistent. The system may further look to the details of the actual policy to see what is covered and whether the claim is covered within the policy.

The system can provide more depth than the manual QA process. For instance, the system may detect certain damage from a photograph (e.g., using computer vision) that may otherwise be missed by a human reviewer. The system may determine whether certain damage is pre-existing or due to a particular event (e.g., based on time-stamped historical images of the property from a geographical image database, such as Eagleview® aerial image database and Google® map database, drone image database, and/or any other suitable image database). The system may also determine whether a damaged object needs to be replaced or can be repaired (e.g., based on learning and training over a large image dataset of damaged properties). The system can provide more breadth than the manual QA process as the system may be able to perform QA checks on every filed claim (e.g., compared to 1% or 10-20% of the claims by human reviewers). For instance, the system may quality-check a claim in a few minutes instead of a few days when using a human reviewer. In some instances, the system may operate in an assistive mode where the system may proactively flag issues detected in the claim files for a human to review. In other instances, the system may operate in a trusted mode where the system may implement corrective actions for issues detected in the claim files.

According to an embodiment of the present disclosure, a computer system may include an AI-based claims QA agent (e.g., a software application). The AI-based claims QA agent may receive claims data including a photo document, a claim document, and a reference document associated with a damaged property (e.g., a house or any building structure).

The claims data may be incoming or inbound claims data queued for QA. The photo document may be generated by a field adjuster during an onsite survey of the damaged property. The photo document may include images of the damaged property and a textual description (e.g., written notes on paper or on a mobile phone) of the damaged property. In some instances, the photo document may be referred to as a photo-sheet. The reference document may include policy, regulation, and/or guideline information associated with the damaged property (or the policyholder) retrieved by the field adjuster or another adjuster. In some instances, the reference document may be referred to as a general loss document. The claim document may be generated by a claim adjuster based on the photo document and the reference document. The claim document may be finalized into a formal document used for determining a payout (e.g., a reimbursement for covered losses or damages) to the policyholder of the damaged property.

The AI-based claims QA agent may perform QA analysis using various AI models to extract information (e.g., key information that is related to damage to the damaged properties) from the photo document, the reference document, and the claim document. For instance, the AI-based claims QA agent may extract the images and the textual description (e.g., handwritten notes by the field adjuster) of the damaged property from the photo document. The AI-based claims QA agent may process the images of the photo document, using a computer vision model (e.g., a segmentation model, a classification model, a deep learning model, a large-vision model (LVM), etc.), to extract first damage information associated with the damaged property. The AI-based claims QA agent may process the textual description of the photo document, using a first natural language processing (NLP) model (e.g., a name property recognition (NER) model, a large-language model (LLM), etc.), or more generally a machine learning (ML) model, to extract second damage information associated with the damaged property.

The first damage information extracted from the images and the second damage information extracted from the textual description may be related to physical or visible elements or features of the damage to property. For instance, the first damage information may include, but is not limited to, a damage type (e.g., water damage, sewer and drain loss, windstorm, hail, etc.), a damaged object (e.g., shingles, pipes, ceilings, floors, walls, etc.), a material type (e.g., asphalt, tile, wood, steel, etc.), and/or a quantity of damaged objects associated with the damaged property. The second damage information may be substantially similar to the first damage information but may additionally include a geographical location (e.g., a state, a county, a city, etc.) of the damaged property. The location information can be important as policy, regulation, guideline, and/or cost can be specific to a certain geographical area as will be discussed more fully later.

The AI-based claims QA agent may further process the claim document using a second NLP model (e.g., a named entity recognition (NER) model, an LLM, etc.), or more generally an ML model, to extract claim information associated with the damaged property. The claim information may include, but is not limited to, an indication of a geographical location (e.g., a state, a county, a city, etc.) of the damaged property and a list of line items for restoring the damaged property (e.g., to its pre-damage condition). A line item is a specific service or item detail of the claim. For instance, each line item may include a service category (e.g., roof replacement, water damage repair, sewer and drain repair, etc.), a description of items to be removed, repaired, or replaced and/or associated labor (e.g., removal of shingles, installation of shingles, etc.), a unit price (e.g., per square foot cost, per linear foot cost, or cost per any suitable measurement unit), and/or a quantity (e.g., a number of items or a number of measurement units). The AI-based claims QA agent may process the reference document using a third NLP model (e.g., an NER model, an LLM, etc.), or more generally an ML model, to extract contextual information associated with at least one of a policy, a regulation, or a guideline associated with a specific location (e.g., a state, a county, a city, etc.). In some instances, the first, second, and third NLP models may be the same. In other instances, the first, second, and third NLP models may include different NLP models.

Next, the AI-based claims QA agent may validate a consistency among the information extracted from the photo document, the reference document, and the claim document and generate a QA report using various AI models. That is, the validation may cross-check information from the different documents. For instance, the validation may include, but is not limited to, checking for a claim description consistency (in the photo document), a policy exclusion (e.g., which may cause certain line items to be out of coverage), an accuracy of cost estimations (e.g., in the line items), and/or a recent policy change (e.g., which may impact the coverage).

For instance, the AI-based claims QA agent may first validate (e.g., a first validation) the accuracy of the photo document by determining whether the textual description (or notes) in the photo document agrees with the visible damages in the images of the photo document. Stated differently, the AI-based claims QA agent may validate a consistency between the first damage information extracted from the images and the second damage information extracted from the textual description to generate a first consistency check result. In an embodiment, as part of the first validation, the AI-based claims QA agent may compute a first similarity measure (e.g., a cosine similarity) between the first damage information and the second damage information. The first similarity measure can be based on a word similarity and/or a contextual similarity. The AI-based claims QA agent may compare the first similarity measure to a first threshold (e.g., a predetermined threshold, a configurable threshold). In an example, the first similarity measure may be between a value of 0 and 1, and the first threshold may be 0.9 or higher. In another example, the first similarity measure may be in terms of a high similarity level, a medium similarity level, or a low similarity level, and the first threshold may be a high similarity level. Generally, the first similarity measure may be at any suitable granularity, and the first threshold may vary depending on the use case scenario or the insurance carriers.

If the first similarity measure satisfies (exceeds) the first threshold, the first damage information is consistent (or agrees) with the second damage information. For instance, the first damage information and the second damage information indicate the same damage type, the same damaged object, the same material type, and the same damaged object count. If, however, the first similarity measure fails to satisfy the first threshold, the first damage information is inconsistent (or disagrees) with the second damage information. The inconsistency may be due to a mismatch between one or more elements in the first damage information and one or more elements in the second damage information. For instance, the first damage information (from the images) may indicate the material type is wood while the second damage information (from the textual description) may indicate the material type is steel.

Subsequently, the AI-based claims QA agent may generate a first textual report based on the information processed from the photo document (e.g., including the first similarity measure, the first damage information, the second damage information, and/or the photo document). The first textual report may include a textual description of a validation pass for the photo document or a discrepancy between the images and the textual description of the photo document. In some instances, the first textual report may include an annotated photo document highlighting areas in the photo document where issues or discrepancies were found.

In an embodiment, the generation of the first textual report may be based on a first LLM. For instance, the AI-based claims QA agent may initiate a first LLM to generate the first textual report based on the first similarity measure (or the threshold comparison result for the first similarity measure), the first damage information (extracted from the images), the second damage information (extracted from the textual description), and the photo document (including the images and the textual description). In some instances, as part of initiating the first LLM, the AI-based claims QA agent may provide an input prompt to the first LLM. The input prompt may include specific instructions, for example, stating the types of data to be processed by the first LLM, rules for assessing the photo document, and the expected output format (e.g., a textual format, an annotated photo document, a summary of discrepancies or an indication of a validation pass, etc.). For instance, the rules may be associated with checking for a consistency between the textual description and the combined images and/or pre-existing damage before the incidence date (when the property is being damaged). In some instances, to facilitate assessment of pre-existed damage, the input prompt may further indicate a storage location of a geographical image database that includes time-stamped historical images of the property. In response, the AI-based claims QA agent may receive the first textual report from the first LLM. The first consistency check result generated from the first validation may include the first similarity measure and the first textual report.

After validating the photo document, the AI-based claims QA agent may consolidate (or combine) the first damage information and the second damage information into third damage information.

Next, the AI-based claims QA agent may validate (e.g., a second validation) the accuracy of the claim document by determining whether the line items in the claim document are consistent (or agree) with the damages shown in the photo document and with the coverage indicated in the policy, regulation, and/or guideline in the reference document. Stated differently, the AI-based claims QA agent may validate a consistency of the claim information extracted from the claim document against the contextual information extracted from the reference document and the third damage information consolidated from the photo document to generate a second consistency check result.

In an embodiment, as part of the second validation, the AI-based claims QA agent may compute a second similarity measure (e.g., a cosine similarity) between: (1) the claim information from the claim document; and (2) the combined contextual information from the reference document and the consolidated third damage information from the photo document. The AI-based claims QA agent may further compare the second similarity measure to a second threshold (e.g., a predetermined threshold or a configurable threshold). In an example, the second similarity measure may be between a value of 0 and 1, and the second threshold may be 0.9 or higher.

If the second similarity measure satisfies (exceeds) the second threshold, the claim information from the claim document is consistent (or agrees) with the contextual information from the reference document and the third damage information from the photo document. As an example, the line items in the claim information may include a replacement cost for steel shingles and the third damage information (from the photo document) also indicates damaged steel shingles. Further, the line items in the claim information are all covered under the policy, regulation, and/or guideline in the contextual information. If, however, the second similarity measure fails to satisfy the second threshold, the claim information from the claim document may be inconsistent (or disagrees) with the third damage information from the photo document and/or the contextual information from the reference document. As an example, the line items in the claim information may include a replacement cost for steel shingles while the third damage information (from the photo document) indicates damaged wood shingles. As another example, one or more of the line items in the claim information are not covered by the policy in the contextual information.

As discussed above, a claim workflow may involve multiple stages of processing by different adjusters at different times. Thus, in some situations, there may be previously processed claims data (e.g., including line items and damage information) for the damaged property stored in memory. In one example, the currently received photo document, claim document, and reference document may be the same as the documents that were used to generate the previously processed claims data. In another example, one or more of the currently received photo document, claim document, and reference document may be newly submitted (e.g., supplemental information based on further inspection of the damaged property and/or further review of the previously processed claims data). Accordingly, there is a need to ensure that the current claim document is aligned with the previously processed claims data. To that end, the AI-based claims QA agent may further compute a third similarity measure (e.g., a sentence or contextual similarity) between the previously processed claims data associated with the damaged property and the claim information extracted from the current claim document. The AI-based claims QA agent may compare the third similarity measure to a third threshold. In an example, the third similarity measure may be between a value of 0 and 1, and the third threshold may be 0.9 or higher. Generally, the first, second, and third thresholds (for the above similarity threshold comparisons) may be any suitable values.

If the third similarity measure satisfies (exceeds) the third threshold, the claim information from the current claim document is consistent (or agrees) with the previously processed claims data. For example, the damage and/or line items indicated by the previously processed claims data match the line item in the claim information (from the current claim document). If, however, the third similarity measure fails to satisfy the third threshold, the claim information from the claim document is inconsistent (or disagrees) with the previously processed claims data. For example, the damage and/or line items indicated by the previously processed claims data include conflicting information (e.g., in terms of service categories, description, unit price, and/or quantity) compared to the line items in the claim information (from the current claim document).

Subsequently, the AI-based claims QA agent may generate a second textual report based on the information processed from the photo document, the reference document, and the claim document (e.g., including the second and third similarity measures (or the corresponding threshold comparison results), the claim information, the contextual information, the consolidated third damage information (from the photo document), the previously processed claims data, the photo document, the reference document, and/or the claim document). The second textual report may include a textual description of a validation pass or a discrepancy among the claim document, the photo document, the reference document, and the previously processed claims data.

In an embodiment, the generation of the second textual report may be based on a second LLM. For instance, the AI-based claims QA agent may initiate a second LLM to generate the second textual report based on the second and third similarity measures (or the corresponding threshold comparison results), the claim information, the contextual information, the consolidated third damage information (from the photo document), the previously processed claims data, the photo document, the reference document, and the claim document. In some instances, as part of initiating the second LLM, the AI-based claims QA agent may provide an input prompt to the second LLM. The input prompt may include specific instructions, for example, stating the types of data to be processed by the second LLM, rules for assessing the claim document, and the expected output format (e.g., a textual format, annotated photo document, reference document, and/or claim document, a summary of discrepancies or an indication of a validation pass, etc.). For instance, the rules may be associated with checking for a policy exclusion and an accuracy of the cost estimation for restoring the damaged property. To facilitate checking the accuracy of the cost estimation, the input prompt may further indicate a storage location of a price list store (e.g., including price codes for materials and/or labor associated with various repairs and/or replacements) and request the second LLM to use the price list store and the contextual information (e.g., the policy, regulation, and guideline) to estimate a cost for restoring the damaged property based on the line items in the claim information. In response, the AI-based claims QA agent may receive the second textual report from the second LLM. The second consistency check result generated from the second validation may include the second similarity measure, the third similarity measure, and the second textual report.

After the first and second validations, the AI-based claims QA agent may have collected various quality concerns from the first and second validations (e.g., including a discrepancy between the images and the textual description in the photo document, a discrepancy between the line items in the claim document and the images in the photo document, and/or a discrepancy between the line items in the claim document and the policy, regulation, and guideline in the reference document). Those quality concerns or issues are included in the first and second consistency results discussed above. Next, the AI-based claims QA agent may initiate a third LLM to generate, based on the first consistency check result, the second consistency check result, and the reference document, a QA report for the claims data. The reference document can provide the third LLM with context for building evidence and knowledge to recommend corrective actions for the claims data. For instance, there may be a situation where certain information in the reference document has not been checked out from the first and second validations (e.g., recent policy change information). Thus, the AI-based claims QA agent may request the third LLM to further look into details of the reference document to identify any relevant information that was not being used to generate the first and second consistency check results. Generally, the first LLM (for generating the first textual report in the first validation), the second LLM (for generating the second textual report in the second validation), and the third LLM may be any suitable LLMs. In some instances, the third LLM may be a higher performance LLM (e.g., in terms of computational resources and/or memory resources) than the first and second LLMs.

For instance, as part of initiating the third LLM, the AI-based claims QA agent may further provide an input prompt to the third LLM. The input prompt may include specific instructions, for example, stating the types of data to be processed by the third LLM, rules for generating the QA report, and the expected output format (e.g., a textual format, annotated photo document, reference document, and/or claim document, a summary of discrepancies or an indication of a validation pass, etc.). The rules may include a rule for checking whether there is any recent policy change (that may cause certain line items to be out of coverage and/or a cost difference based on the premium) and a rule for recommending actions to correct the issues found. The rule for checking for a recent policy change may include applicable information about a given policy at the time of the claim versus the time when the policy was initiated. For example, an insurance coverage can be changed from a full coverage to a partial coverage. In response, the AI-based claims QA agent may receive, from the third LLM, the QA report indicating an issue (or discrepancies) in the photo document, the claim document, and/or the reference document. The QA report may also include an annotated photo document and/or an annotated claim document highlighting issues found. The QA report may further include a recommendation to correct the issues.

In an embodiment, the AI-based claims QA agent may operate in an assistive mode. For instance, the AI-based claims QA agent may provide the QA report information with the flagged issues via a user interface (UI) of the computer system. In such an embodiment, a human operator may correct the issue and may optionally resubmit the corrected document(s) to the AI-based claims QA agent for another QA assessment. Alternatively, the AI-based claims QA agent may send the QA report (e.g., via an email) to a human reviewer who is responsible for reviewing the claims data associated with the damaged property. In another embodiment, the AI-based claims QA agent may operate in a trusted mode. For instance, the AI-based claims QA agent may update the photo document, the claim document, and/or the reference document to correct the flagged issues (e.g., based on the recommended corrective actions in the QA report).

In an embodiment, the photo document, the claim document, and the reference document are portable document format (PDF) documents. The AI-based claims QA agent may parse information in the photo document, claim document, and the reference document and store those documents in Parquet format. In an embodiment, the AI-based claims QA agent may preprocess those documents to provide better quality image and/or more coherent text representations prior to analyzing those documents. For instance, the AI-based claims QA agent may preprocess the images of the photo document before processing the images using the computer vision model. The image preprocessing may include resolution enhancement, image normalization, background removal, occlusion detection, and various other image processing techniques discussed more fully below. Further, the AI-based claims QA agent may preprocess (e.g., textual-based and/or linguistic-based) the textual description of the photo document before processing the textual description using the first NLP model. The textual and/or linguistic preprocessing may include text extraction (e.g., using optical character recognition (OCR)), text normalization, contextual preprocessing, and various other textual and/or linguistic processing techniques discussed more fully below. The AI-based claims QA agent may also perform similar textual and/or linguistic preprocessing on the claim document and the reference document before processing the claim document and the reference document using respectively the second NLP model and third NLP model.

According to a further embodiment of the present disclosure, the computer system may further include an AI-based QA model trainer (e.g., a software application) for training AI models (e.g., for extracting information from claims data documents and QA report generation) in the AI-driven QA assessment discussed above. The AI-based QA model trainer may perform substantially the same operations as the AI-based claims QA agent discussed above. The AI-based QA model trainer may operate on training data including a photo document, a reference document, and a claim document similar to the photo document, the reference document, and the claim document, respectively, in the incoming claim data. In some instances, the training data may be real claims data of damaged properties in the real world. In other instances, the training data may be synthetic claims data generated based on real claims data as will be discussed below.

In one embodiment, the AI-based QA model trainer may train AI models for information extraction. As part of the training, the AI-based QA model trainer may perform the same information extraction operations as the AI-based claims QA agent discussed above. Subsequently, the AI-based QA model trainer may evaluate first damage information extracted from the images in the photo document using a computer vision model, the second damage information extracted from the textual description in the photo document using a first NLP model, the contextual information extracted from the reference document using a second NLP model, and the claim information extracted from the claim document using a third NLP model. For instance, the AI-based QA model trainer may compute a performance metric (or a similarity score) based on the first damage information, the second damage information, the contextual information, and the claim information. The performance metric may include an indication of an inconsistency or a discrepancy between the images and the textual description in the photo document based on a comparison of the first damage information and the second damage information. Additionally or alternatively, the performance metric may include an indication of an inconsistency or a discrepancy between the claim information (from the claim document) and damage information consolidated from the first damage information and the second damage information (from the photo document). Additionally or alternatively, the performance metric may include an indication of an inconsistency or a discrepancy between the claim information (from the claim document) and the contextual information (from the reference document). The AI-based QA model trainer may further compare the performance metric to a reference assessment (e.g., from human feedback). The AI-based QA model trainer may provide the comparison result to the computer vision model, the first NLP model, the second NLP model, and/or the third NLP model. The AI-based QA model trainer may cause an update of one or more parameters in the computer vision model, the first NLP model, the second NLP model, and/or the third NLP model based on the comparison.

In another embodiment, the AI-based QA model trainer may further perform the same QA report generation operations using an LLM (e.g., the third LLM) as the AI-based claims QA agent discussed above. The AI-based QA model trainer may evaluate the generated QA report against a reference QA assessment (e.g., feedback of a human reviewer). The AI-based QA model trainer may provide, based on the evaluation, feedback to the LLM. In this way, the LLM may learn to recognize or detect certain issues in the photo document, the reference document, and the claim document, determine reasons for the detected issues, and/or determine corrective actions for the detected issues. In general, the AI model training can be applied during deployments (e.g., periodically) to fine-tune the AI models. That way, the AI models can continue to improve and learn new damage scenarios as they arise.

According to a further embodiment of the present disclosure, the computer system may further include an AI-based claims data generator (e.g., a software application) for generating synthetic claims data (e.g., to be used for training AI models as discussed above). Synthetic claims data can be useful, for example, to simulate claims for extreme damage scenarios that are rare (e.g., caused by catastrophic events such as severe hurricanes or earthquakes) so that AI models can learn to analyze claims data for those rare scenarios. Further, synthetic claims data can increase the volume of claims data to be used for training, and thus can improve the accuracy of the AI models. For instance, the AI-based claims data generator may generate synthetic claims data using a real claims database including real images of damaged properties and corresponding textual descriptions of the respective real images as a knowledge base.

In one embodiment, the AI-based claims data generator may use an LVM, an LLM, and an embeddings combinator to generate synthetic claims data from real claims data. For instance, the AI-based claims data generator may process a real photo document including a real image of a first damaged property and a textual description associated with the image to generate visual embeddings corresponding to the real image using the LVM. The AI-based claims data generator may further process the real photo document to generate first textual embeddings corresponding to the textual description associated with the image using the LVM. The AI-based claims data generator may process a real claim document including real claim information (e.g., claim type, location, line items, etc.) associated with the first damaged property to generate second textual embeddings corresponding to a summary of the claim information using an LLM. To enable coherency between the visual embeddings and the first textual embeddings generated by the LVM and the second textual embeddings generated by the LLM, the LVM may share those visual embeddings and the first textual embeddings with the LLM. Thus, the LLM may generate the second textual embeddings further based on the visual embeddings and the first textual embeddings. In an embodiment, the LVM and the LLM may be trained to have a shared representation of claim information associated with damaged properties through their embeddings. In other words, the LVM and the LLM may be trained to generate consistent embeddings associated with damaged properties and corresponding claims. Next, the embeddings combinator (e.g., a transformer model, an ML model) may combine the visual embeddings, the first textual embeddings, the second textual embeddings to generate a synthetic photo document and a synthetic claim document. The synthetic photo document may include a synthetic image of a second damaged property and a textual description associated with the synthetic image. The synthetic claim document may include synthetic claim information associated with the second damaged property.

In another embodiment, the AI-based claims data generator may use a multimodal large language model (MLLM) to generate synthetic claims data from real claims data. For instance, the AI-based claims data generator may process a real photo document including a real image of a first damaged property and a textual description associated with the image to generate visual embeddings corresponding to the real image using a visual encoder of the MLLM. The AI-based claims data generator may further process the real photo document to generate first textual embeddings corresponding to the textual description associated with the image using a transformer-based language model of the MLLM. The AI-based claims data generator may process a real claim document including real claim information (e.g., claim type, location, line items, etc.) associated with the first damaged property to generate second textual embeddings corresponding to a summary of the claim information using the transformer-based language model of the MLLM. In an embodiment, the MLLM may be trained to generate unified visual embeddings and textual embeddings associated with damaged properties and corresponding claims. Next, the MLLM may combine the visual embeddings, the first textual embeddings, the second textual embeddings to generate a synthetic photo document and a synthetic claim document. The synthetic photo document includes a synthetic image of a second damaged property and a textual description associated with the synthetic image. The synthetic claim document includes synthetic claim information associated with the second damaged property.

In an embodiment, the AI-based claims data generator may cross-check synthetic claims data generated from the different AI models (e.g., LLM, LVM, and MLLM). For instance, the AI-based claims data generator may compare a first synthetic image and a corresponding first textual description (e.g., referred to as first synthetic claims data) generated separately by the LVM and the LLM to a second synthetic image and a corresponding second textual description (e.g., referred to as second synthetic claims data) generated jointly by the MLLM. The AI-based claims data generator may compute a difference metric between the first synthetic claim data and the second synthetic claim data. If the difference metric satisfies (or is below) a certain threshold, the AI-based claims data generator may store both the first synthetic claim data and the second synthetic claim data in a synthetic claims database. If the difference metric fails to satisfy the certain threshold, the AI-based claims data generator may determine a performance metric (e.g., based on human feedback) for each of the first synthetic claims data and the second synthetic claims data. The AI-based claims data generator may select the synthetic claims data with the higher performance metric (e.g., one of the first synthetic claims data or the second synthetic claims data) and store the selected synthetic claims data in the synthetic claims database. The AI-based claims data generator may discard the one with the lower performance metric (e.g., the other one of first synthetic claims data or the second synthetic claims data).

The disclosed embodiments overcome technical challenges in analyzing and validating a consistency across documents including images. To that end, the disclosed embodiments digest and analyze the images and language data in the documents iteratively and merge the consistency check results at each iteration to provide an integrated consistency report. For instance, in an additional embodiment, a computer-implemented method of analyzing images and language data in multiple documents iteratively to generate an integrated result using AI is provided. The method includes receiving, by an application on a computer system, a plurality of documents, each including at least one of an image or textual data associated with a particular context. The application processes a first document of the plurality of documents using a first ML model to extract first information associated with the particular context from at least one of a respective image or respective textual data of the first document.

The application further analyzes each of the other documents of the plurality of documents to validate a consistency across the plurality of documents to generate a plurality of consistency check results. For instance, as part of the analyzing, the application processes an individual document of the other documents using a second ML model to extract second information associated with the particular context from at least one of a respective image or respective textual data of the respective document. Further, the application validates a consistency of the second information of the individual document against the first information of the first document (e.g., based on a contextual similarity measure) to generate a respective one of the plurality of consistency check results.

In an embodiment, as part of processing the individual document, the application processes the individual document using a third ML model to extract third information associated with the particular context from the respective image of the individual document. Further, the application processes the individual document using a fourth ML model to extract, fourth information associated with the particular context from the respective textual data of the individual document, where the second information includes the third information and the fourth information. Further, the analyzing includes validating a consistency between the third information and the fourth information to generate a respective one of the plurality of consistency check results. In an embodiment, the third ML model corresponds to a computer vision model, and the fourth ML model corresponds to an NLP model.

After generating the plurality of consistency check results, the application initiates a large-language model (LLM) to generate, based on the plurality of consistency check results, an integrate result associated with a consistency across the plurality of documents. In response, the application receives, from the LLM, the integrated result indicating a discrepancy in one or more documents of the plurality of documents.

Using an AI-based claims QA agent to quality-check filed claims can speed up the QA process (e.g., from a few days to a few minutes per claim), and thus allowing every filed claim to be quality-check instead of 10-20% of the filed claims when using a manual human review process. Using computer visions to extract damage information from images of a damaged property in a photo document can provide a more detailed analysis than a human reviewer can. For instance, computer vision may detect certain damages that may be missed by a human reviewer. Further, preprocessing the images using image processing techniques (e.g., resolution enhancement) can improve the quality of the images, and thus can further detect damages that may be difficult for a human reviewer even with careful analysis.

Comparing images of a damaged property with time-stamped historical images of the property from a geographical database enables the detection of pre-existing damage. Performing textual and/or linguistic preprocessing of textual data in a photo document, a claim document, and/or a reference document can improve the coherency and/or representations prior to analyzing information in those documents, and thus can improve the accuracy of the analysis.

Further, validating a consistency between current claims data associated with a certain filed claim and previously processed (at least partially processed) claims data for the same filed claim can ensure claim processing (for the same filed claim) by different adjusters and/or at different time points remain consistent. Using AI models for QA analysis can allow the AI models to learn from a large amount of claims data (including images of damaged properties and corresponding line items, etc.), and thus can provide more accurate analysis of damage (e.g., determine whether a damaged object needs to be replaced or can be repaired) and/or more accurate cost estimations. Including annotations in a photo document, a claim document, and/or a reference document highlighting issues from QA analysis in a QA report and/or a UI can assist human reviewers to quickly locate the issues and take corrective actions. Using the AI-based claims QA agent to directly make updates or correct detected issues from the QA analysis can further improve QA efficiency. Generating synthetic claims data based on real claims data can allow the creation of claims data for rare or extreme damage scenarios (where real claims data for such scenarios may be limited) so that AI models can learn to analyze those scenarios. Further, synthetic claims data can increase the volume of claims data to be used for training, and thus can improve the accuracy of the AI models.

The AI-based claims QA agent discussed herein may be used in various use cases. In a first use case, the AI-based claims QA agent highlights QA related issues to be fixed by adjusters shortening the QA process. In a second use case, the AI-based claims QA agent operates as the QA overseeing adjusters. In a third use case, the AI-based claims QA agent interacts with adjusters during a QA process (rather than overseeing after) and provides feedback and/or guidance (supporting claim adjustments). In a fourth use case, the AI-based claims QA agent operates as the adjuster adjusting claims. In a fifth use case, the AI-based claims QA agent is used as a tool assisting the original claimant to more accurately build their claim in advance of adjusting or providing additional required information in support of adjusting. While the present disclosure is discussed in the context of QA analysis and reporting for property damages, the AI-driven QA analysis and reporting discussed herein can be applicable to other types of damages (e.g., vehicle damages, etc.).

In regard to the third use case discussed above, the AI-based claims QA agent may interact with an adjuster during the claims processing workflow. For example, the AI-based claims QA agent may receive a photograph from the adjuster and identify that the image is incorrectly labeled or categorized. In another example, the AI-based claims QA agent may receive a cost estimate from the adjuster and identify that a line item or calculation in the estimate contains errors. Having the AI-based claims QA agent provide real-time guidance to the adjuster during claim processing helps direct the adjuster through the claims workflow and may reduce errors downstream. Further, combining this granular, real-time QA analysis during the claims process with the comprehensive analysis performed by the AI-based claims QA agent on completed claims enables a more comprehensive approach to quality assurance, thereby producing more consistent and accurate claims processing outcomes.

The AI-based claims QA agent may be configured to perform varying levels of automation depending on operational circumstances. The degree of automation may be dynamically adjusted based on resource availability, claim complexity, client preferences, risk tolerance, and/or business requirements.

For example, when a claim's complexity exceeds a predetermined threshold, the AI-based claims QA agent may reduce its automation and escalate more tasks to human adjusters for review. Conversely, for claims with complexity below the threshold, the AI-based claims QA agent may increase automation to handle a greater share of the QA process independently.

Resource availability provides another basis for adjusting automation levels. When adjuster availability for a particular claim category exceeds a predetermined threshold, the AI-based claims QA agent may be configured to perform less automation and defer more tasks to human adjusters. Conversely, when adjuster availability falls below the threshold, the AI-based claims QA agent may increase its automation level to handle a greater proportion of the QA workload. The AI-based claims QA agent may integrate with a workforce management system to obtain real-time data regarding adjuster availability.

The AI-based claims QA agent may communicate with the workforce management system through one or more application programming interfaces (APIs) or data integration protocols. In one embodiment, the AI-based claims QA agent periodically queries the workforce management system to retrieve current workforce metrics. In another embodiment, the workforce management system may push real-time updates to the AI-based claims QA agent when workforce conditions change beyond predetermined thresholds.

The data exchanged between the AI-based claims QA agent and the workforce management system may include a variety of information. For instance, the data exchanged may include the number of available adjusters by skill level or certification, the number of claims currently assigned to each adjuster, average claim processing time by adjuster and claim type, adjuster workload capacity metrics, scheduled absences or availability windows, adjuster specialization areas or expertise classifications, historical performance data for specific claim categories, and/or other data.

Upon receiving workforce data from the workforce management system, the AI-based claims QA agent may execute a dynamic automation adjustment algorithm. This algorithm may evaluate multiple factors to determine an appropriate automation level for incoming or in-process claims. The AI-based claims QA agent may implement a real-time adjustment mechanism that modifies automation levels dynamically as workforce conditions change throughout the business day.

The AI-based claims QA agent may further incorporate a feedback loop mechanism that learns from historical integration data. The system may track the outcomes of claims processed at different automation levels under various workforce conditions, measuring metrics such as claim processing accuracy, cycle time, customer satisfaction scores, and/or adjuster productivity. This historical data may be analyzed using machine learning algorithms to optimize the dynamic automation adjustment algorithm.

Turning now to FIG. 1, a network system 100 that provides efficient, systematic, AI-driven QA assessment for insurance claims data is described. The system 100 may include incoming claims data 110 (e.g., queued for QA), AI models 120, a price list database 122, a policy database 124, a network 130, one or more users 140, one or more user computing devices 142, and an AI-driven QA system 150 (e.g., a computer system). The network 130 promotes communication between the components of the network system 100. The network 130 may be any communication network including a public data network (PDN), a public switched telephone network (PSTN), a private network, and/or a combination.

The price list database 122 may store a set of codes used to define pricing for services, repairs, and/or replacements covered by an insurance policy. As an example, a certain price code may represent the cost to replace a square foot of roofing material. As another example, a certain price code may represent the cost to repair a square foot of drywall. As a further example, a certain price code may present the labor cost associated with repairs (e.g., by contractors, electricians, plumbers, etc.). These price codes may assist adjusters to estimate the cost (e.g., item cost) to restore a damaged property 102 (e.g., to its pre-damage condition).

The policy database 124 may include various policies, regulations, and/or guidelines for covering certain damages. The policies, regulations, and/or guidelines may be different for different geographical locations. That is, policies, regulations, and/or guidelines may be location specific. As an example, a certain state may require consideration for depreciation. As another example, a certain state may not have sales tax. As yet another example, hurricane damages may not be covered by all states. Different policies may also provide different levels of insurance coverage (e.g., based on the premiums). These policies, regulations, and/or guidelines may assist adjusters to determine the types of services, repairs, and/or replacements that may be covered and/or adjustments to the item costs estimated based on the price codes.

The users 140 may include field adjusters, claim adjusters, reviewers (e.g., adjusters), claimants or property owners (policyholders). A field adjuster may visit the location of an incident and perform an onsite damage survey. A desk adjuster (e.g., working at the office) may determine policy coverage, estimate repair costs, and/or determine payout. In some instances, a field adjuster may also be a claim adjuster for the particular claim which the field adjuster has performed the onsite damage survey. The field adjuster and the claim adjuster may generally be referred to as an adjuster. A human reviewer may be an expert claim adjuster who reviews filed claims that are flagged with issues by the AI-driven QA system 150 as will discussed more fully below. Further, in some instances, a human reviewer may assist training of the AI models 120 for QA analysis and/or synthetic claims data generation by providing feedback as will be discussed more fully below. The user computing devices 142 may include cell phone(s), mobile phone(s), smart phone(s), personal digital assistant(s) (PDA(s)), laptop computers, tablet computer(s), notebook computer(s), and/or desktop computer(s).

The incoming claims data 110 may include claims data associated with the damaged property 102. In the illustrated example of FIG. 1, the damaged property 102 is a house. However, a damaged property 102 may be any building structures that may be covered under an insurance policy. In some instances, the damage to the property 102 may have resulted from weather and/or climate related incidents such as storms, hurricanes, tornadoes, typhoons, earthquakes, hail, wind, lightning, or other incidents or activities (e.g., water leak). The incoming claims data 110 may include a photo document 112, a reference document 114, and a claim document 116 associated with the damaged property 102. In certain examples, the photo document 112, the reference document 114, and the claim document 116 may be PDF documents. Generally, the photo document 112, the reference document 114, and the claim document 116 may be in any suitable document format.

In an example, the owner (e.g., a policyholder) of the damaged property 102 may call the insurance company to file a claim about the damage, and the insurance company may dispatch a field adjuster to the damaged property 102. The field adjuster may manually survey the damaged property 102, capture images of the damaged areas, measure the damaged area(s), and take notes (e.g., by hand on paper or a mobile device) describing the type and/or the extent of the damage. The field adjuster may input the captured images and the notes to generate the photo document 112 (e.g., using a user computing device 142).

To process the claim, an adjuster (e.g., the field adjuster or another adjuster) may generate the claim document 116 based on the damages shown in the images and/or descriptions (e.g., textual description) in the notes of the photo document 112. The claim document 116 may include an indication of a geographical location or area (e.g., the state, the county, the city, etc.) of the damaged property 102. The claim document 116 may also include a list of line items for restoring the damaged property 102. For instance, each line item may include a service category (e.g., roof replacement, water damage repair, sewer and drain repair, etc.), a description of items to be removed, repaired, or replaced and/or associated labor (e.g., removal of shingles, installation of shingles, etc.), a unit price (e.g., per square foot cost, per linear foot cost, or any suitable measurement unit), and/or a quantity (e.g., a number of items or a number of measurement units). The claim document 116 may include various other information such as claimant information (e.g., policyholder's name and contact information), insurer company information, date (e.g., date of the incident, date of the claim filing), claim number (e.g., a unique number identifying the claim filed for the damaged property 102), etc.

To determine the line items, the adjuster may retrieve policy information, regulation information, and/or guideline information for the specific location of the damaged property 102 from the policy database 124. The adjuster may determine the services, material, and/or items for replacement or repair based on the damages shown in the images and/or described in the notes of the photo document 112 and in accordance with the retrieved policy information, regulation information, and/or guideline information. The adjuster may also retrieve price codes for the line items from the price list database 122. The adjuster may save the retrieved location-specific policy information, location-specific regulation information, and/or location-specific guideline information and the corresponding specific location in the reference document 114 (or general loss document). Subsequently, the claim document 116 may be finalized into a formal document used for determining a payout to the policyholder (the claimant).

The AI-driven QA system 150 (e.g., a computer system) may include at least one non-transitory memory and at least one processor. The AI-driven QA system 150 may include an AI-based claims QA agent 152 including instructions stored in the memory and executable by the processor. At a high level, the AI-based claims QA agent 152 may receive the incoming claims data 110 including the photo document 112, the reference document 114, and the claim document 116 associated with a claim filed for the damaged property 102. The AI-based claims QA agent 152 may perform analysis using various AI models 120 to extract information from the photo document 112, the reference document 114, and the claim document 116. The AI-based claims QA agent 152 may determine whether the information in the photo document 112, the reference document 114, and the claim document 116 are accurate and consistent (e.g., based on similarity measures and/or LLM processing). The AI-based claims QA agent 152 may generate a QA report based on the consistency determination (e.g., using LLM processing). The QA report may indicate issues in the photo document 112, the reference document 114, and/or the claim document 116 and may provide reason(s) for the detected issues. Alternatively, the QA report may indicate an approval (e.g., a QA pass) of the photo document 112, the reference document 114, and/or the claim document 116.

When there are issues detected in the photo document 112, the reference document 114, and/or the claim document 116, the AI-based claims QA agent 152 may initiate an action to correct the issues. In one embodiment, the AI-based claims QA agent 152 may operate in an assistive mode to report (or flag) the issues to a human reviewer (e.g., via a user interface (UI) 158). In some instances, the UI 158 can be a web browser. In another embodiment, the AI-based claims QA agent 152 may operate in a trusted mode to correct the issues (e.g., by updating the photo document 112, the reference document 114, and/or the claim document 116). The operations of the AI-based claims QA agent 152 are discussed more fully below with reference to FIGS. 2-6 and 10A-10B.

The AI-driven QA system 150 may further include an AI-based QA model trainer 154 and an AI-based claims data generator 156, each including instructions stored in the memory and executable by the processor. The AI-based QA model trainer 154 may train one or more AI models 120 to perform QA analysis using real claims data (e.g., generated for damaged properties 102 in the real world) and/or synthetic claims data as will be discussed more fully below with reference to FIGS. 7-8 and 11A-11B. The AI-based claims data generator 156 may generate synthetic claims data based on real claims data as will be discussed more fully below with reference to FIGS. 9 and 12. The synthetic claims data may simulate claims for damage scenarios that are rare (e.g., caused by some catastrophic events such as severe hurricanes or earthquakes) so that the AI models 120 may learn to analyze those rare damage scenarios. Further, the synthetic claims data can increase the volume of claims data to be used for training to improve the accuracy of the AI models 120.

The AI models 120 may include LLMs, LVMs, MLLMs, computer vision models, NLP models, and ML models. In some instances, the LLMs may be of different LLM types having different attributes. For instance, the LLMs may include, but are not limited to, one or more OpenAI® models (e.g., a GPT-3 model, a GPT-3.5 model, a GPT-4 model), one or more open-source LLMs, an LLM Meta AI (Llama) model, and a Google Gemini® model). Generally, as more advanced AI models (e.g., LLM, NLP, and/or ML models) are available, the AI-driven QA system 150 may utilize the more advanced AI models to improve the claims QA performance. The different LLMs may have different performances, robustness, or strengths (e.g., for summarization of issues detected in the claims data 110, for deep reasoning of causes of the detected issues and/or recommendation for corrective actions in QA reports, etc.). For instance, the different LLMs may have different transformer architectures and may be trained on different types of datasets (e.g., from different technical fields and in various data modes, such as audio, video, and/or texts) and/or different amounts of data. The different LLMs may also have different associated costs (e.g., in terms of computational resources, memory resources, and/or token costs). Generally, the higher the performance of the LLM, the higher the cost. Similarly, in some instances, the LVMs may include LVMs of different LVM types (e.g., having different architectures, trained on different data, different strengths, different costs in terms of computational resources, memory resources, and token costs, etc.). The MLLMs may also include MLLMs of different MLLM types (e.g., having different architectures, trained on different data, different strengths, different costs in terms of computational resources, memory resources, and/or token costs, etc.).

In some instances, the computer vision models may include a segmentation model and a classification model. In an example, the segmentation model may be a deep learning or machine learning model trained to partition an image into multiple parts or regions. In an example, the classification model may be a deep learning or machine learning model trained to assign a label or a class to an image or a portion of the image. In some instances, the NLP models may include an NER model, which may be a deep learning or ML model trained to identify and/or classify named entities in text. In some instances, the AI models 120 may also include text preprocessing models and/or image preprocessing models. As will be discussed more fully below with reference to FIGS. 2-6 and 10A-10B, the AI-based claims QA agent 152 may invoke various AI models 120 at different stages of claims data analysis and QA report generation. In some instances, the system 100 may further include previously processed claims data 126 because of the multi-stage processing flow. The AI-driven QA assessment may further consider the previously processed claims data 126 as will be discussed more fully below with reference to FIGS. 4 and 10A-10B.

Figure 2:
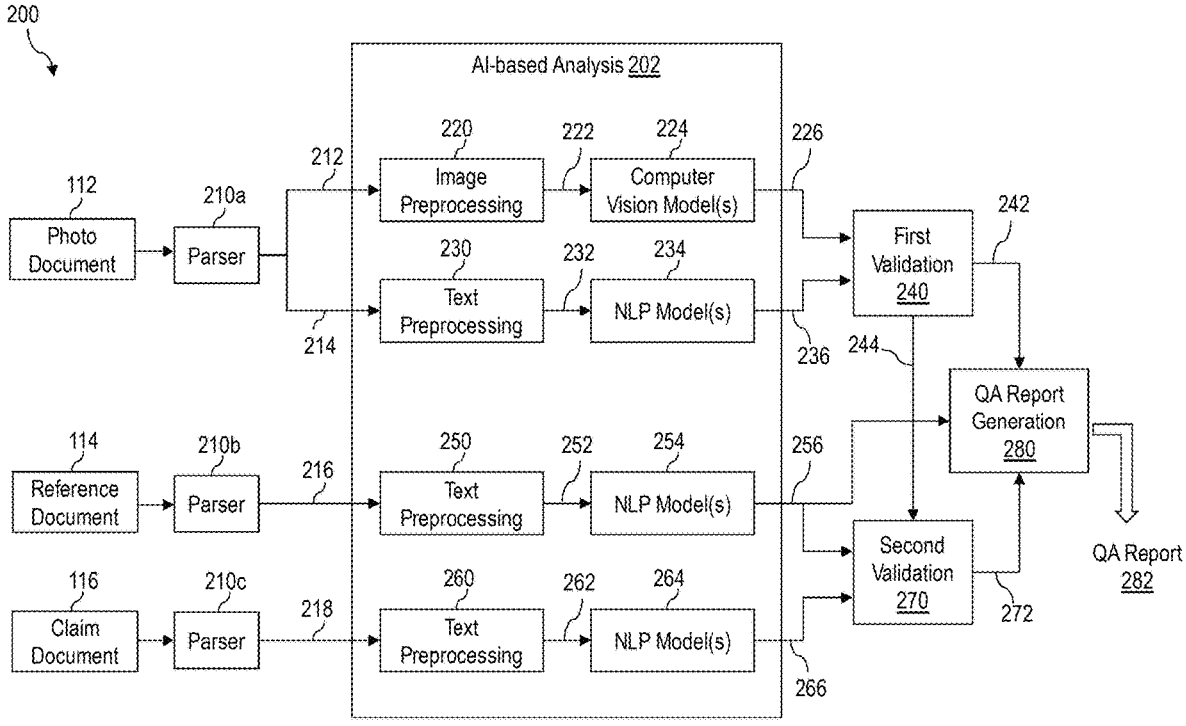
FIG. 2 is a block diagram illustrating an example process of performing AI-driven QA assessment of insurance claims data according to an embodiment of the disclosure.

Turning now to FIG. 2, an example process 200 of performing AI-driven QA assessment of insurance claims data is described. The process 200 may be performed by the AI-based claims QA agent 152. For ease of illustration, FIG. 2 only shows the main data path. However, the photo document 112, the reference document 114, the claim document 116, and/or associated intermediate processed data may be propagated throughout the processing chain to enable various (textual) report generations as will be discussed more fully below. The AI-based claims QA agent 152 may receive the photo document 112, the reference document 114, and the claim document 116 associated with the damaged property 102. The AI-based claims QA agent 152 may parse the photo document 112, reference document 114, and claim document 116 separately using respective parsers 210a, 210b, or 210c. The parsers 210a, 210b, and 210c may include parsing scripts. In some instances, the photo document 112, the reference document 114, and the claim document 116 may be PDF documents and the parser scripts may be a PyMuPDF library tool. In some instances, the parsed information may be in parquet format. The parquet format may store data (e.g., textual data and/or image data) in columns, which may ease storage and retrieval.

As shown, the parser 210a may parse the photo document 112 into image data 212 and text data 214. The image data 212 may correspond to the images of the damaged property 102 captured by the field adjuster during an onsite survey of the damaged property 102. The text data 214 may correspond to the notes (e.g., the textual description of the type and extent of the damage) taken by the field adjuster during the onsite survey. The parser 210b may parse the reference document 114 into text data 216 (e.g., including the policy information, the regulation information, and the guideline information and the associated location information, the claim summary, etc.). The parser 210c may parse the claim document 116 into text data 218 (e.g., including the line items, the location of the damage property, etc.).

After parsing the photo document 112, the reference document 114, and the claim document 116, the AI-based claims QA agent 152 may perform AI-based analysis 202 to extract key information from the photo document 112, the reference document 114, and the claim document 116 for QA check. The AI-based analysis 202 may utilize various AI models 120 and/or any other suitable analysis techniques. In some cases, the images in the photo document 112 may be taken under a poor lighting condition (e.g., when it is dark or over exposure) and/or at an angle that may not provide the best view of the damage. Thus, it may be beneficial to preprocess the images before proceeding to extract information from the images. In some cases, the notes describing the damage may be handwritten (by the field adjuster), and the handwriting may not be easily read and may vary vastly across different field adjusters. In some cases, the notes describing the damage may be typed (using a mobile phone or tablet by the field adjuster) but may have spelling and/or grammatical mistakes. Accordingly, it may be desirable to preprocess images and/or text data in the documents 112, 114, and 116 to provide better quality images and/or more coherent representation of text data prior to extracting information from those documents 112, 114, and 116.

As shown, the AI-based claims QA agent 152 may preprocess the image data 212 of the photo document 112 by applying image preprocessing 220 to enhance the quality of the image data 212. The image preprocessing 220 may include various image processing techniques, for example, including but are not limited to, image resizing and scaling, noise reduction, image normalization, contrast and brightness adjustment, color correction and conversion, standardization of color representation, geometric transformations, image enhancements, edge detection and feature extraction, data augmentation, image compression, background removal and segmentation, orientation and alignment, artifacts and anomalies removal, standardization of image formats, automated quality checks, and/or resolution enhancement. Generally, the image preprocessing 220 may utilize AI models 120 or non-AI image processing techniques.

Image resizing and scaling may include standardizing dimensions and normalizing pixel values to ensure consistency across image datasets. Noise reduction may include utilizing Gaussian blur, median filtering, and bilateral filtering to eliminate unwanted artifacts while preserving important details. Image normalization may include applying histogram normalization and Z-score normalization to maintain consistent pixel intensity values across image datasets. Contrast and brightness adjustment may include enhancing feature visibility through histogram equalization and adaptive contrast enhancement. Color correction and conversion may include standardizing color representation via white balance adjustment and converting to appropriate color spaces like grayscale, red-green-blue (RGB), depth-RBG (D-RGB), or hue-saturation-value (HSV). Geometric transformations may include aligning images through rotation, flipping, cropping, and correcting distortions with affine and perspective transformations. Image enhancement may include improving the visual quality by sharpening edges and enhancing structural features using edge-detection algorithms. Edge detection and feature extraction may include identifying important structural information with techniques such as Canny edge detection and feature extraction methods like scale-invariant feature transform (SIFT) and/or speed-up robust feature (SURF).

Image data augmentation may include increasing dataset diversity through random rotations, shifts, scaling, zooming, and varying brightness and contrast as well as augmenting real images with synthetic images. Image compression may include reducing storage requirements with lossless (e.g., portable network graphics (PNG)) and lossy (e.g., joint photographic expert group (JPEG)) compression methods without significant information loss. Background removal and segmentation may include isolating relevant objects using thresholding, masking, and advanced segmentation algorithms like mask region-based convolutional neural network (R-CNN) or segmenting-anything model (SAM). Orientation and alignment may include ensuring consistent image orientation through autorotation and alignment algorithms based on key features. Artifacts and anomalies removal may include cleaning images by eliminating unwanted marks and reflections using inpainting and reflection removal techniques. Standardization of image formats may include ensuring uniformity by converting images to standard formats (e.g., JPEG, PNG, tag image file format (TIFF)) and standardizing metadata. Automated quality checks for images may include implementing blurriness detection, exposure analysis, and duplicate detection to maintain dataset integrity. Resolution enhancements may include up-sampling images to increase the number of pixels in the images, for example, to fix blurry images and/or pixelated images.

The AI-based claims QA agent 152 may preprocess the text data 214 (the notes or textual description of the damaged property 102) of the photo document 112 by applying text preprocessing 230 (e.g., including textual-based and linguistic-based processing) to provide more coherent representation of the text data 214 (prior to extracting information from the text data 214). The text preprocessing 230 may include, for example, but are not limited to, text extraction, text normalization, noise reduction, handwritten recognition enhancements, language detection and standardization, property recognition and structuring, abbreviations and acronyms handling, formatting and tokenization, contextual preprocessing, privacy and data protection preprocessing, data augmentation for language, and automated quality checks. Generally, the text preprocessing 230 may utilize AI models 120 or non-AI textual processing techniques.

Text extraction may include performing OCR, which may include converting handwritten or typed notes into machine-readable text (e.g., with specialized handling for handwriting variability). Text extraction may also include handling OCR errors, which may include utilizing spell checkers and confidence scoring to correct and validate extracted text. Text normalization may include converting text to lowercase, removing punctuation and special characters, eliminating stop-words, and applying stemming or lemmatization to reduce words to their base forms. Noise reduction may include correcting typos and misspellings using automated spell checkers and contextual correction methods such as LLMs (e.g., with fine-tuning or prompt engineering) and removing irrelevant information through regex patterns and template-based filtering. Handwriting recognition enhancements may include improving OCR accuracy with image preprocessing techniques like binarization, noise reduction, and de-skewing, and handling diverse handwriting styles through custom OCR models and adaptive thresholding. Language detection and standardization may include identifying the language of the text with library tools (e.g., langdetect and FastText tools) and standardizing multilingual data through machine translation services. Entity recognition and structuring may include extracting key entities using NER models and organizing unstructured text into structured data fields via template matching and data mapping. Handling abbreviations and acronyms may include expanding abbreviations with dictionaries and contextual expansion, and standardizing terminology through synonym replacement and controlled vocabularies. Formatting and tokenization may include splitting text into tokens for detailed analysis and standardizing data formats for dates, times, and numbers to ensure consistency.

Contextual preprocessing may include addressing domain-specific language and jargon unique to insurance claims with custom dictionaries and semantic analysis or use of pre-trained LLMs with additional prompt engineering or fine-tuning. Privacy and data protection preprocessing may include anonymizing sensitive information through data masking and redaction and ensuring compliance with regulations. Text data augmentation for language may include enhancing dataset diversity with synonym replacement and paraphrasing to improve model robustness. Automated quality checks for text data may include verifying consistency and completeness through cross-field validation, syntax and grammar checks, field presence validation, and data range checks.

Figure 3:
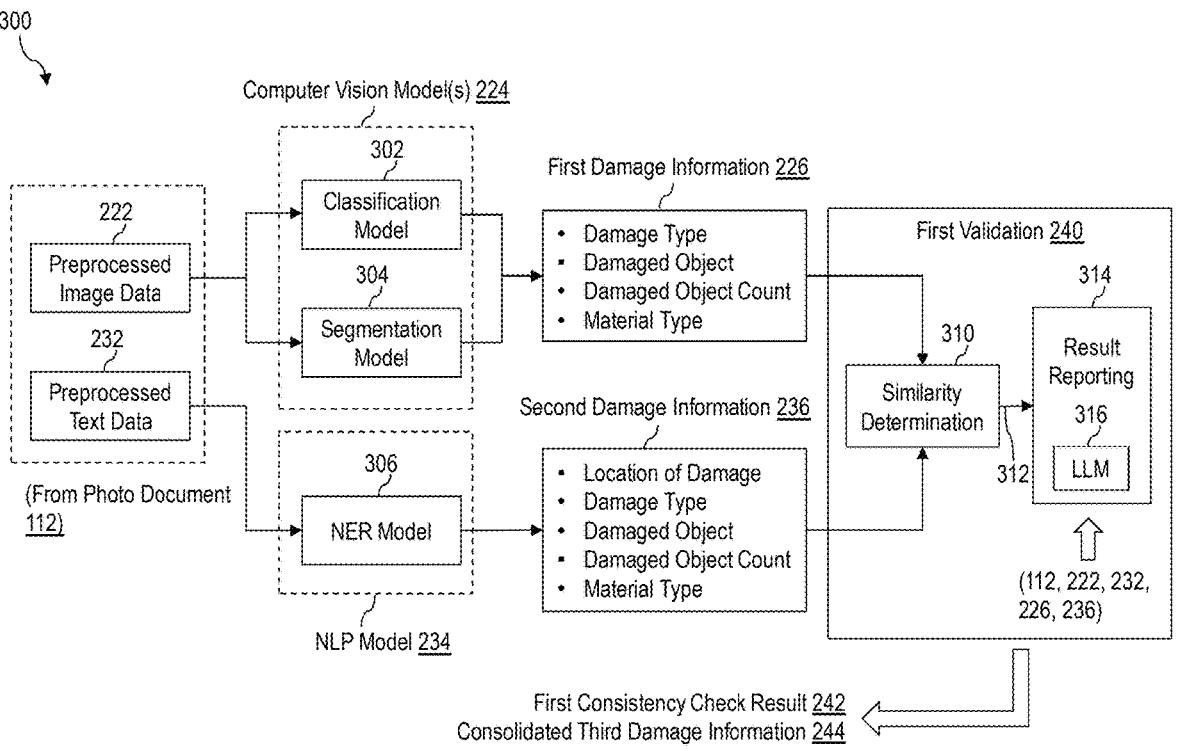
FIG. 3 is a block diagram illustrating an example process of validating a photo document for AI-driven QA assessment according to an embodiment of the disclosure.

After applying the image preprocessing 220 to the image data 212, the AI-based claims QA agent 152 may apply one or more computer vision models 224 (e.g., AI models 120) to the preprocessed image data 222 to extract first damage information 226 associated with the damaged property 102. After applying the text preprocessing 230 to the text data 214, the AI-based claims QA agent 152 may apply one or more NLP models 234 (e.g., AI models 120) to the preprocessed text data 232 to extract second damage information 236 associated with the damaged property 102. Next, the AI-based claims QA agent 152 may validate the accuracy of the photo document 112. For instance, the AI-based claims QA agent 152 may perform first validation 240 to validate a consistency between the first damage information 226 (extracted from the image data 212 of the photo document 112) and the second damage information 236 (extracted from the text data 214 of the photo document 112). The AI-based claims QA agent 152 may generate a first consistency check result 242 based on the first validation 240. Further, the first validation 240 may consolidate the first damage information 226 and the second damage information 236 into third damage information 244. FIG. 3 provides a more detailed view of operations associated with validating the photo document 112.

Turning now to FIG. 3, an example process 300 of validating the photo document 112 is described. As shown in FIG. 3, as part of applying the one or more computer vision models 224, the AI-based claims QA agent 152 may apply a classification model 302 and a segmentation model 304 to the preprocessed image data 222 (of the photo document 112). The classification model 302 may assign a label or a class to an image (e.g., the preprocessed image data 222) or a portion of the image. The segmentation model 304 may partition an image (e.g., the preprocessed image data 222) into multiple parts or regions. In an example, the segmentation model 304 may provide a set of bounded boxes (e.g., a set of segments or contours) within the image. The bounded boxes and/or segmented regions may facilitate a damaged area and/or damaged count calculation (e.g., area of a damaged roof top and/or number of damaged shingles, etc.), which forms the basis for cost estimation as will be discussed more fully below. In some instances, the classification model 302 and the segmentation model 304 may be AI models 120. In some instances, the segmentation model 304 may segment each image in the preprocessed image data 222 into multiple segments or bounded boxes (e.g., corresponding to damaged areas), and the classification model 302 may assign a class to each bounded box. In the illustrated example of FIG. 3, the AI-based claims QA agent 152 may extract, from the preprocessed image data 222, the first damage information 226 including a damage type (e.g., roof damage, water damage, sewer and drain loss, windstorm, hail, etc.), a damaged object (e.g., shingles, pipes, ceilings, floors, walls, etc.), a damaged object count (e.g., a quantity of damaged objects), and/or a material type (e.g., asphalt, tile, wood, steel, etc.). As an example, roof damage may include multiple areas of wood shingle damage or missing shingles, and the segmentation model 304 may output bounded boxes, each corresponding to one of the damaged areas. The classification model 302 may output an indication of shingles as the damaged object and an indication of wood as the material type.

As part of applying the one or more NLP models 234, the AI-based claims QA agent 152 may apply an NER model 306 to the preprocessed text data 232 (of the photo document 112). In some instances, the NER model 306 may be an AI model 120. The NER model 306 may detect and categorize key entities from text. In the illustrated example of FIG. 3, the NER model 306 may extract, from the preprocessed text data 232, the second damage information 236 including a geographical location of the damaged property 102 (e.g., Florida), a damage type (e.g., roof damage, water damage, sewer and drain loss, windstorm, hail, etc.), a damaged object (e.g., shingles, pipes, ceilings, floors, walls, etc.), a damaged object count (e.g., a quantity of damaged objects), and/or a material type (e.g., asphalt, tile, wood, steel, etc.).

After extracting the first damage information 226 and the second damage information 236 from the photo document 112, the AI-based claims QA agent 152 may perform the first validation 240 to determine the accuracy of the photo document 112. The first validation 240 may include performing a similarity determination 310 to determine a similarity measure 312 between the first damage information 226 (extracted from the image data 212 of the photo document 112) and the second damage information 236 (extracted from the text data 214 of the photo document 112). In an example, the similarity measure 312 may be a cosine similarity. For instance, the similarity determination 310 may apply a sentence transformer to the first damage information 226 and the second damage information 236 separately to generate a first encoded vector and a second encoded vector, respectively. The sentence transformer may be based on word encoding and/or contextual encoding. The cosine similarity may be an angle between the first and second encoded vectors. The first validation 240 may compare the similarity measure 312 to a first threshold (e.g., a predetermine threshold or a configurable threshold). In an example, the similarity measure 312 may be between a value of 0 and 1 and the first threshold may be 0.9 or higher.

If the similarity measure 312 satisfies (exceeds) the first threshold, the first damage information 226 (from the preprocessed image data 222) is consistent with (or matches) the second damage information 236 (from the preprocessed text data 232). For instance, the first damage information

226 and the second damage information 236 indicate the same damage type, the same damaged object, the same material type, and the same damaged object count. If, however, the similarity measure 312 fails to satisfy the first threshold, the first damage information 226 (from the preprocessed image data 222) is inconsistent with (or different than) the second damage information 236 (from the preprocessed text data 232). The inconsistency may be due to a mismatch between one or more information pieces in the first damage information 226 and one or more information pieces in the second damage information 236. For instance, the first damage information 226 (from the images) may indicate the material type is wood while the second damage information 236 (from the textual description) may indicate the material type is steel.

Subsequently, the AI-based claims QA agent 152 may perform result reporting 314 based on the information processed from the photo document 112 (e.g., including the first similarity measure 312 (and/or the threshold comparison result for the similarity measure 312), the preprocessed image data 222, the preprocessed text data 232, the first damage information 226, and the second damage information 236, and/or the photo document 112) to generate a first textual report. The first textual report may include a textual description of a validation pass for the photo document 112 or a discrepancy between the images and the textual description in the photo document 112. In an example, the first textual report includes a statement stating: "There is a discrepancy in the material type, where the images show roof damage while the textual description indicates water damage." In some instances, the first textual report may include an annotated version of the photo document 112 (e.g., at least a portion of the photo document 112 with annotations) highlighting areas in the photo document 112 where issues or discrepancies were found.

In an embodiment, the generation of the first textual report may be based on an LLM 316 (e.g., an AI model 120). For instance, the AI-based claims QA agent 152 may initiate the LLM 316 to generate the first textual report based on the first damage information 226 (extracted from the images), the second damage information 236 (extracted from the textual description), the similarity measure 312, the preprocessed image data 222, the preprocessed text data 232, and/or the photo document 112. In some instances, as part of initiating the LLM 316, the AI-based claims QA agent 152 may provide an input prompt to the LLM 316. The input prompt may include specific instructions, for example, stating the types of data (e.g., including the photo document 112, the preprocessed image data 222, the preprocessed text data 232, the first damage information 226, and/or the second damage information 236) to be processed by the LLM 316. The input prompt may also include the expected output format (e.g., a textual format, an annotated photo document, a summary of discrepancies or an indication of a validation pass, etc.). The input prompt may further include rules for assessing the photo document 112. For example, a first rule may state: "Your job is to assess whether the textual description is consistent for the damage in all the combined images. Make one assessment which takes into account all the images. Only evaluate based on what you see in the images. The images show the full extent of the damage you need to evaluate. Do not assume there might be other damage not captured in the image." Further, a second rule may state: "Your job is to check for pre-existed damage before the incidence date. Use the images and the textual description to assess whether part of the damage may have existed before the incidence and flag if that is the case. Be critical in your assessment and only flag for damage that is not most likely pre-existing. Only discuss pre-existing damage and nothing else." In some instances, to further facilitate assessment of pre-existing damage, the input prompt may further indicate a storage location (e.g., a uniform resource locator (URL)) of a geographical image database that includes time-stamped historical images of the damaged property 102. In an example, the geographical image database may be Google® map or Google® earth or Eagleview®. In response, the AI-based claims QA agent 152 may receive the textual report from the LLM 316. The first consistency check result 242 may include the similarity measure 312 and the first textual report.

As part of the first validation 240, the AI-based claims QA agent 152 may also consolidate the first damage information 226 and the second damage information 236 into third damage information elements 244 based on the first consistency check result 242 (or more specifically the first similarity measure 312). The third damage information 244 may include elements (e.g., the damage type, the damaged object, the quantity of damaged object, and the material type) that pass the consistency check. That is, the third damage information 244 may include matching elements between the first damage information 226 and the second damage information 236. In an example, the first damage information 226 may indicate that the damage type is roof damage, the damaged objects are shingles, the material type is asphalt, and the second damage information 236 may indicate that the location is Florida, the damage type is roof damage, the damaged objects are shingles, and the material type is wood. In such an example, the third damage information 244 may indicate that the damage type is roof damage, and the damaged objects are shingles but may not indicate the material type as there is a mismatch between the material type in the first damage information 226 (being asphalt) and the material type in the second damage information 236 (being wood). In some instances, the third damage information 244 may be a combination of the first damage information 226 and the second damage information 236.

Returning to FIG. 2, the AI-based claims QA agent 152 may also preprocess the text data 216 of the reference document 114 and the text data 218 of the claim document 116 to provide a more coherent representation of the respective text data 216 and 218 prior to extracting information from the respective text data 216 and 218. As shown, the AI-based claims QA agent 152 may apply text preprocessing 250 and 260 respectively to the text data 216 and 218. The text preprocessing 250 and 260 may be substantially similar to the text preprocessing 230 (applied to the text data 214 of the photo document 112) discussed above. Next, the AI-based claims QA agent 152 may apply one or more NLP models 254 to the preprocessed text data 252 (from the reference document 114) to extract contextual information 256 from the preprocessed text data 252. Similarly, the AI-based claims QA agent 152 may apply one or more NLP models 264 to the preprocessed text data 262 (from the claim document 116) to extract claim information 266 from the preprocessed text data 262. Next, the AI-based claims QA agent 152 may validate the accuracy of the claim document 116. For instance, the AI-based claims QA agent 152 may perform second validation 270 to validate a consistency of the claim information 266 (from the claim document 116) against the consolidated third damage information 244 (from the photo document 112) and the contextual information 256 (from the reference document 114). The AI-based claims QA agent 152 may generate a second consistency check result

Figure 4:
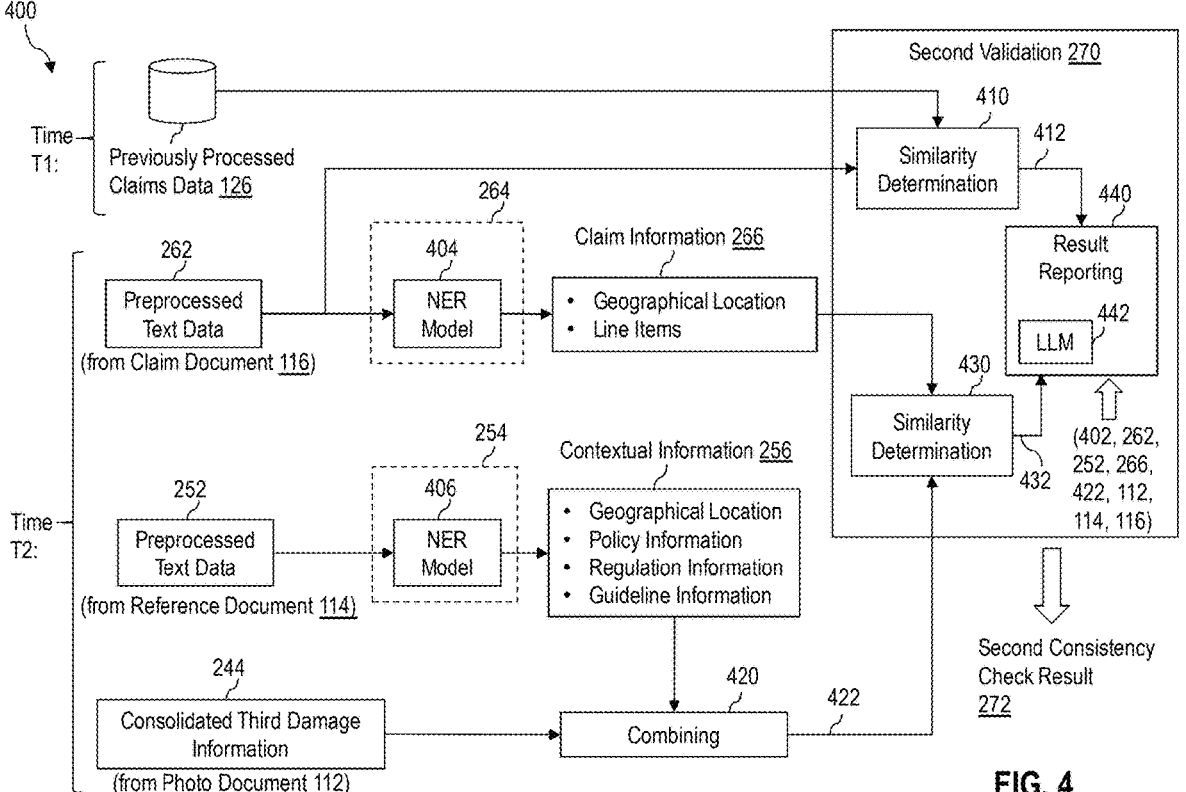
FIG. 4 is a block diagram illustrating an example process of validating a claim document for AI-driven QA assessment according to an embodiment of the disclosure.

272 based on the second validation 270. FIG. 4 provides a more detailed view of operations associated with validating the claim document 116.

Turning now to FIG. 4, an example process 400 of validating the claim document 116 is described. As shown in FIG. 4, as part of applying the one or more NLP models 264, the AI-based claims QA agent 152 may apply an NER model 404 to the preprocessed text data 262 (of the claim document 116). The NER model 404 may be similar to the NER model 306 discussed above. In the illustrated example of FIG. 4, the NER model 404 may extract, from the preprocessed text data 262, the claim information 266 including an indication of a geographical location of the damaged property 102 (e.g., Florida) and a list of line items. For instance, each line item may include a service category (e.g., roof replacement, water damage repair, sewer and drain repair, etc.), a description of items to be removed, repaired, or replaced and/or associated labor (e.g., removal of shingles, installation of shingles, etc.), a unit price (e.g., per square foot cost, per linear foot cost, or any suitable measurement unit), and/or a quantity (e.g., a number of items or a number measurement units).

As part of applying the one or more NLP models 254, the AI-based claims QA agent 152 may apply an NER model 406 to the preprocessed text data 252 (from the reference document 114). The NER model 406 may be similar to the NER models 306 and 404. In the illustrated example of FIG. 4, the NER model 406 may extract, from the preprocessed text data 252, the contextual information 256 including policy information, regulation information, guideline information (e.g., legal information) specific to a certain location (e.g., Florida), and an indication of the certain location. In some instances, the contextual information 256 may also include a claim summary for the damaged property 102.

The AI-based claims QA agent 152 may perform combining 420 to combine the consolidated third damage information 244 from the photo document 112 (discussed above with reference to FIG. 3) and the contextual information 256 into combined information 422. That is, the combined information 422 may include the policy, regulation, and guideline information, the specific location for the policy, regulation, and guideline information, the damage type, the damaged objects, the damage object count, the material type, and the location of the damaged property 102.

The AI-based claims QA agent 152 may perform a similarity determination 430 to determine a similarity measure 432 (e.g., a cosine similarity) between the claim information 266 (from the claim document 116) and the combined information 422 (from the reference document 114 and the photo document 112). The similarity determination 430 may be based on a word similarity or a contextual similarity. For instance, the similarity determination 430 may utilize a sentence transformer to encode the claim information 266 into a first encoded vector and the combined information 422 into a second encoded vector based on word encoding or contextual encoding. Subsequently, the similarity determination 430 may measure an angle difference between the first and second encoded vectors to provide the similarity measure 432. The second validation 270 may compare the similarity measure 432 to a second threshold (e.g., a predetermined threshold or a configurable threshold). In an example, the similarity measure 432 may be between a value of 0 and 1 and the second threshold may be 0.9 or higher.

If the similarity measure 432 satisfies (exceeds) the second threshold, the claim information 266 from the claim document 116 is consistent with (or matches) the contextual information 256 from the reference document 114 and the third damage information 244 from the photo document 112. As an example, the line items in the claim information 266 may include a replacement cost for steel shingles and damaged steel shingles are indicated in the third damage information 244 (from the photo document 112). Further, the line items in the claim information 266 are all covered under the policy, regulation, and/or guideline in the contextual information 256. If, however, the similarity measure 432 fails to satisfy the second threshold, the claim information 266 from the claim document 114 may be inconsistent with the third damage information 244 from the photo document 112 and/or the contextual information 256 from the reference document 114. As an example, the line items in the claim information 266 may include a replacement cost for steel shingles while damaged wood shingles are indicated in the third damaged information 244 (from the photo document 112). As another example, one or more of the line items in the claim information 266 may not be covered by the policy in the contextual information 256

As discussed above, in some situations, a filed claim for the damaged property 102 may be processed at multiple time points. As an example, at a previous time T1, first claims data for the damaged property 102 may be processed. The first claims data may include a first photo document similar to the photo document 112, a first reference document similar to the reference document 114, and a first claim document similar to the claim document 116. The processing at time T1 may be substantially similar to the processing in the process 300 and the process 400 discussed above. For instance, the processing may include extracting and consolidating damage information, such as a damage type, damaged objects, a damaged object count, a material type, and a location of the damaged property 102, from images and a textual description of the first photo document. The processing may further include extracting claim information from the first claim document and extracting contextual information from the first reference document. The information extracted from the first photo document, the first reference document, and the first claim document may be stored in memory (e.g., shown as previously processed claims data 126).

The photo document 112, the reference document 114, and the claim document 116 may be received by the AI-based claims QA agent 152 at a current time T2. In some instances, the photo document 112, the reference document, 114, and the claim document 116 may be the same as the first photo document, the first reference document, and the first claim document, respectively. In some instances, the photo document 112 may be different than the first photo document (processed at time T1), where the photo document 112 may include additional images and/or notes. In some instances, the claim document 116 may be different than the first claim document (processed at time T1), where the claim document 116 may include updated and/or additional line items. Generally, the reference document 114 is the same as the first reference document (unless the adjuster provided the wrong reference document, e.g., not associated with the claim for the damaged property 102, to the AI-based claims QA agent 152).

Because claims data for the damaged property 102 may be processed at multiple time points, the QA process may further check that any previously processed claims data 126 is also consistent with currently received incoming claims data 110. As shown, the AI-based claims QA agent 152 may further perform a similarity determination 410 to determine a similarity measure 412 (e.g., a cosine similarity) between previously processed claims data 126 and the preprocessed text data 262 from the current claim document 116 (received at the current time T2). The similarity determination 410 may determine a contextual similarity (a sentence similarity). For instance, the similarity determination 410 may utilize a sentence transformer to encode the previously processed claims data 126 into a first encoded vector and the preprocessed text data 262 into a second encoded vector based on contextual encoding. Subsequently, the similarity determination 410 may measure an angle difference between the first and second encoded vectors to provide the similarity measure 412. The AI-based claims QA agent 152 may compare the similarity measure 412 to a third threshold. In an example, the similarity measure 412 may be between a value of 0 and 1, and the third threshold may be 0.9 or higher.

If the similarity measure 412 satisfies (exceeds) the third threshold, the claim information 266 from the current claim document 116 is consistent (or agrees) with the previously processed claims data 126. For example, the damage and/or line items indicated by the previously processed claims data 126 match the line items in the claim information 266 (from the current claim document 116). If, however, the similarity measure 412 fails to satisfy the third threshold, the claim information 266 from the claim document 116 is inconsistent (or disagrees) with the previously processed claims data 126. For example, the damage and/or line items indicated by the previously processed claims data 126 fails to match one or more of the line items in the claim information 266 (from the current claim document 116).

Subsequently, the AI-based claims QA agent 152 may perform result reporting 440 based on the information processed from the photo document 112, the reference document 114, and the claim document 116 (e.g., including the similarity measures 412 and 432 (or the corresponding threshold comparison results), previously processed claims data 126, the preprocessed text data 262 (from the claim document 116), the preprocessed text data 252 (from the reference document 114), the claim information 266, the combined information 422, the photo document 112, the reference document 114, and/or the claim document 116) to generate a second textual report. The second textual report may include a textual description of a validation pass or a discrepancy among the claim information 266 (from the claim document 116), the third damage information 244 (from the photo document 112), the contextual information 256 (from the reference document 114), and the previously processed claims data 126. When there is a discrepancy, the second textual report may further include the reason for the discrepancy. As an example, the second textual report includes a statement stating: "There is a discrepancy in the line item for roof replacement, which is not covered by the policy." As another example, the second textual report includes a statement stating: "There is a discrepancy in the location, where the claim information 266 indicates Florida while the contextual information 256 indicates Texas." As yet another example, the second textual report may include a statement stating that: "There is a discrepancy in the damaged material, where the line items in the claim information 266 indicates steel while wood is detected by a computer vision model 224." As a further example, the second textual report includes a statement stating: "There is a discrepancy in the damage severity, where the claim information 266 indicates a moderate severity while a high severity is detected by the computer vision model 224."

In an embodiment, the generation of the second textual report may be based on an LLM 442 (e.g., an AI model 120).

For instance, the AI-based claims QA agent 152 may initiate the LLM 442 to generate the second textual report based on the similarity measures 412 and 432 (or the corresponding threshold comparison results), the claim information 266 from the claim document 116, and the combined information 422 (e.g., the combined contextual information 256 from the reference document 114 and the third damage information 244 from the photo document 112). In some instances, as part of initiating the LLM 442, the AI-based claims QA agent 152 may further provide an input prompt to the LLM 442. The input prompt may include specific instructions, for example, stating the types of data (e.g., including the similarity measures 412 and 432 (or corresponding threshold comparison results), the claim information 266 from claim document 114, the combined information 422, the preprocessed text data 262 and 252, the photo document 112, the reference document 114, and the claim document 116) to be processed by the LLM 442. The input prompt may also include the expected output format (e.g., a summary of discrepancies or a consistency check approval). The input prompt may include rules for assessing the claim document 116.

For instance, a first rule may state: "Your job is to assess whether the images and the claim information are related to damage excluded by the policy. Use provided information and assume there is no exclusion on the policy if one is not given to you. Flag if there is damage that is excluded by the policy." Further, a second rule may state: "You have been given photo related to damage for an insurance claim. Only evaluate based on what you see in the image. The images show the full extent of the damage and you need to evaluate. Do not assume there is other damage not captured in the image. Take into account existing price list for fixing damages: fixing a few shingles is typically $X1, fixing a large portion of shingles cost $X1 to $X3, replacing an entire roof costs $X4 to $X5, mold from water damage is typically $X6 to $X7, pumping out water is typically $X8 to $X9, new gutter costs around $X10. Make an assessment of the damage shown in the photos and cross reference with the price list. Your job is to critically assess whether the estimated report cost is too high or too low and flag if it is." In some instances, to facilitate checking the accuracy of the cost estimation, the input prompt may further indicate a storage location of the price list database 122 (e.g., including price codes for materials and/or labor associated with various repairs and/or replacements) and request the LLM 442 to use the price list database 122 and the contextual information 256 (e.g., the policy, regulation, and guideline) to estimate a cost for restoring the damaged property 102 based on the line items in the claim information 266. In response, the AI-based claims QA agent 152 may receive the second textual report from the second LLM. The second consistency check result 272 may include the similarity measure 412, the similarity measure 432, and the second textual report.

Figure 5:
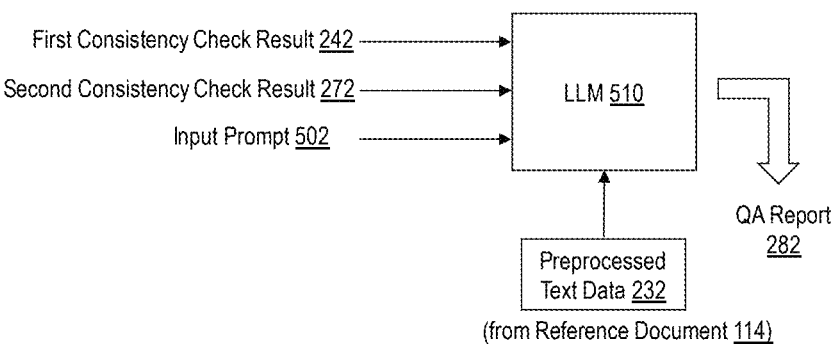
FIG. 5 is a block diagram illustrating an example process of generating a QA report for AI-driven QA assessment according to an embodiment of the disclosure.

Returning to FIG. 2, after validating the accuracy of the photo document 112 (the first validation 240) and validating the accuracy of the claim document 116 (the second validation 270), the AI-based claims QA agent 152 may have collected various quality concerns from the first validation 240 and the second validation 270 (e.g., including a discrepancy between the images and the textual description in the photo document 112, a discrepancy between the line items in the claim document 116 and the images in the photo document 112, and/or a discrepancy between the line items in the claim document 116 and the policy, regulation, and guideline in the reference document 114). Next, the AI-based claims QA agent 152 may perform QA report generation 280 to generate a QA report 282. The QA report 282 may be generated based on the first consistency check result 242 and the second consistency check result 272. FIG. 5 provides a more detailed view of operations associated with generating the QA report 282.

Turning now to FIG. 5, an example process 500 of generating a QA report 282 is described. As shown in FIG. 5, the AI-based claims QA agent 152 may initiate an LLM 510 to generate a QA report 282 for the claims data 110 based on the first consistency check result 242 (including the first textual report and the similarity measure 312), the second consistency check result 272 (including the second textual report and the similarity measures 412 and 432), and the reference document 114. The reference document 114 can provide the LLM 510 with context for building evidence and knowledge to recommend corrective actions for the claims data 110 (the photo document 112, the reference document 114, and the claim document 116). For instance, there may be a situation where certain information in the reference document 114 has not been checked out or confirmed from the first validation 240 and the second validation 270 (e.g., recent policy change information). Thus, the AI-based claims QA agent 152 may request the LLM 510 to further look into details of the reference document 114 that was not checked out or confirmed as part of generating the first consistency check result 242 and the second consistency check result 272.

As part of initiating the LLM 510, the AI-based claims QA agent 152 may further provide an input prompt 502 to the LLM 510. The input prompt 502 may include specific instructions, for example, stating the types of data to be processed by the LLM 510, rules for generating the QA report 282, and the expected output format (e.g., a textual format, annotated photo document 112, reference document 114, and/or claim document 116, a summary of discrepancies or an indication of a validation pass, etc.). As an example, a first rule may state: "Are there any changes in the policy within 14 days before the claim incidence date? If there are changes, your job is to assess whether the policy changes cause certain line items to be out of the coverage and/or a cost difference based on the premium and flag those line items." Further, a second rule may state: "Your job is to recommend actions to correct the issues found. As an example, a recommended corrective action may be: "Update line items following recent changes to the policy." As another example, a recommended corrective action may be: "Add/remove the following line items from the estimate payout following recent changes to the policy." In response, the AI-based claims QA agent 152 may receive, from the LLM 510, the QA report 282 indicating an issue (or discrepancies) in the photo document 112, the claim document 116, and/or the reference document 114. The QA report 282 may include annotated versions of the photo document 112 and/or claim document 116 highlighting the issues found. In some situations, the QA report 282 may indicate that the wrong reference document 114 has been applied. For instance, the adjuster may have provided the wrong document (e.g., for another location or another policyholder, etc.). The QA report 282 may further include a recommendation to correct the issues.

Figure 6:
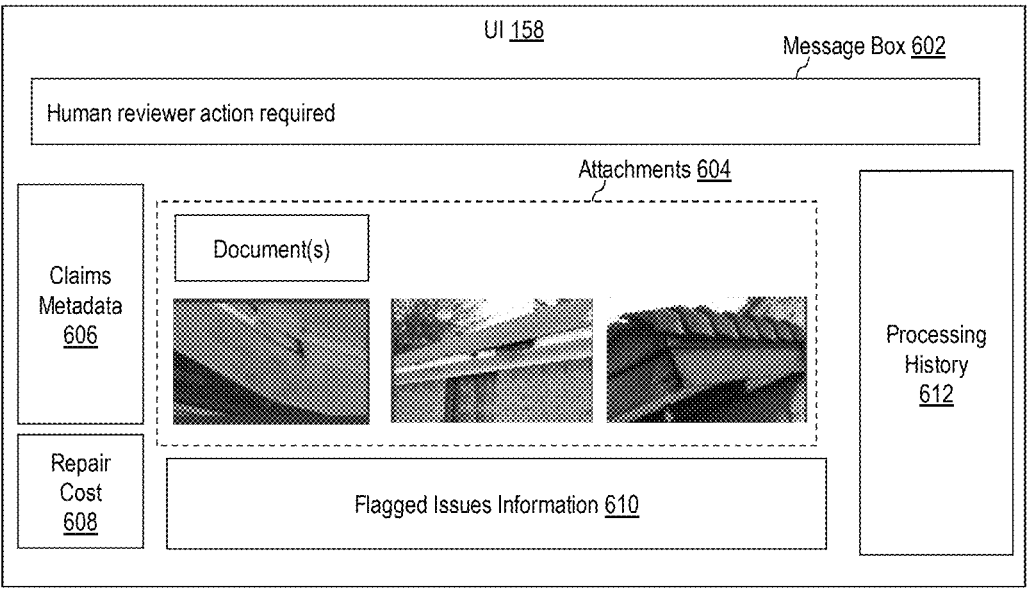
FIG. 6 is a block diagram illustrating an example user interface for displaying QA report information for AI-driven QA assessment according to an embodiment of the disclosure.

In an embodiment, the AI-based claims QA agent 152 may operate in an assistive mode. For instance, the AI-based claims QA agent 152 may provide the QA report 282 with the flagged issues via the UI 158 of the AI-driven QA system 150 (e.g., as shown in FIG. 6). In such an embodiment, a human reviewer may correct the issue and may optionally resubmit the corrected document(s) to the AI-based claims QA agent 152 for another QA assessment. Alternatively, the AI-based claims QA agent 152 may send the QA report 282 (e.g., via an email) to a human reviewer who is responsible for reviewing the claims data 110 associated with the damaged property 102. In another embodiment, the AI-based claims QA agent 152 may operate in a trusted mode. For instance, the AI-based claims QA agent 152 may initiate updating of or update the claim document 116 to correct the flagged issues (e.g., based on the recommended corrective actions in the QA report 282). As an example, the QA report 282 may flag an issue related to the estimated cost for a line item in the claim document 116, and the AI-based claims QA agent 152 may correct the cost for that line item.

Turning now to FIG. 6, an example UI 158 for displaying QA report information for the claims data 110 is described. As shown, the UI 158 may include a message box 602, attachments 604, claims metadata 606, repair cost information 608, flagged issues information 610, and a processing history 612. The message box 602 may indicate that an action is required from a human reviewer (e.g., based on issues flagged in the QA report 282). The attachments 604 may include the photo document 112 (where the images are shown by the photos in FIG. 6), the reference document 114, and/or the claim document 116.

The claims metadata 606 may include various information including, for example, but not limited to, a claim description, inspection details, date of loss, location state, repair estimate, claim or damage type, severity code (e.g., 1, 2, 3 for low, medium, and high severity or any other severity level granularity), coverage likelihood (e.g., likely or unlikely), number of flagged issues to be reviewed (e.g., 1, 2, 3, 4 or more), number of non-flagged issues, policy (e.g., the policy number), claim status (e.g., in progress), handling (e.g., full), billing structure (e.g., indemnity). Full handling refers to managing a claim from start to finish by a dedicated claims adjuster or team. Other types of handling include but are not limited to partial/limited handling, field handling, etc. The "non-flagged issues" include claim aspects that passed the QA checks (i.e., no problems were found with these elements). In the illustrated example of FIG. 6, the damage may be related to water damage with minor roof damage (as shown by the photos). Thus, the claim description in the claims metadata 606 may indicate that the property (e.g., the damaged property 102) is extensively affected by water overflow and the claim type is water damage. The repair cost information 608 may indicate the cost to be invoiced for repairing the damage.

The flagged issues information 610 may indicate the number of flagged issues. For each flagged issue, the flagged issues information 610 may indicate the rule applied to detect the respective issue, a description of the respective issue, and the status of the issue (e.g., flagged). As an example, a flagged issue may indicate that the rule used is claim description inconsistency check, and the description may state, "The images show damage to the exterior soffit and fascia of the property, which is indicative of water overflow from the gutters, not interior water damage. The claim description mentions damage to floors and personal property, which is not supported by the visible damage in the images provided." Generally, the flagged issues information 610 may indicate the application of a claim description inconsistency rule, a repair cost estimation rule, a policy exclusion rule, and/or a recent policy change rule discussed above.

As discussed above, claims data for a particular claim may be processed at different time points and by different adjusters. The processing history 612 may list all the past processing history for the particular claim. For instance, for each processing event, the processing history 612 may indicate the adjuster's name, the processing date and/or time, the policy number used for the processing, and any other information for tracking purposes.

FIG. 6 is merely an example of a UI 158 for displaying QA report information, and variations are contemplated to be within the scope of the present disclosure. In embodiments, the UI 158 may include other components not illustrated in FIG. 6. In embodiments, the UI 158 may not include every component illustrated in FIG. 6. In embodiments, the components may be implemented with different connections than those illustrated in FIG. 6. Such and other embodiments are contemplated to be within the scope of the present disclosure.

Figure 7:
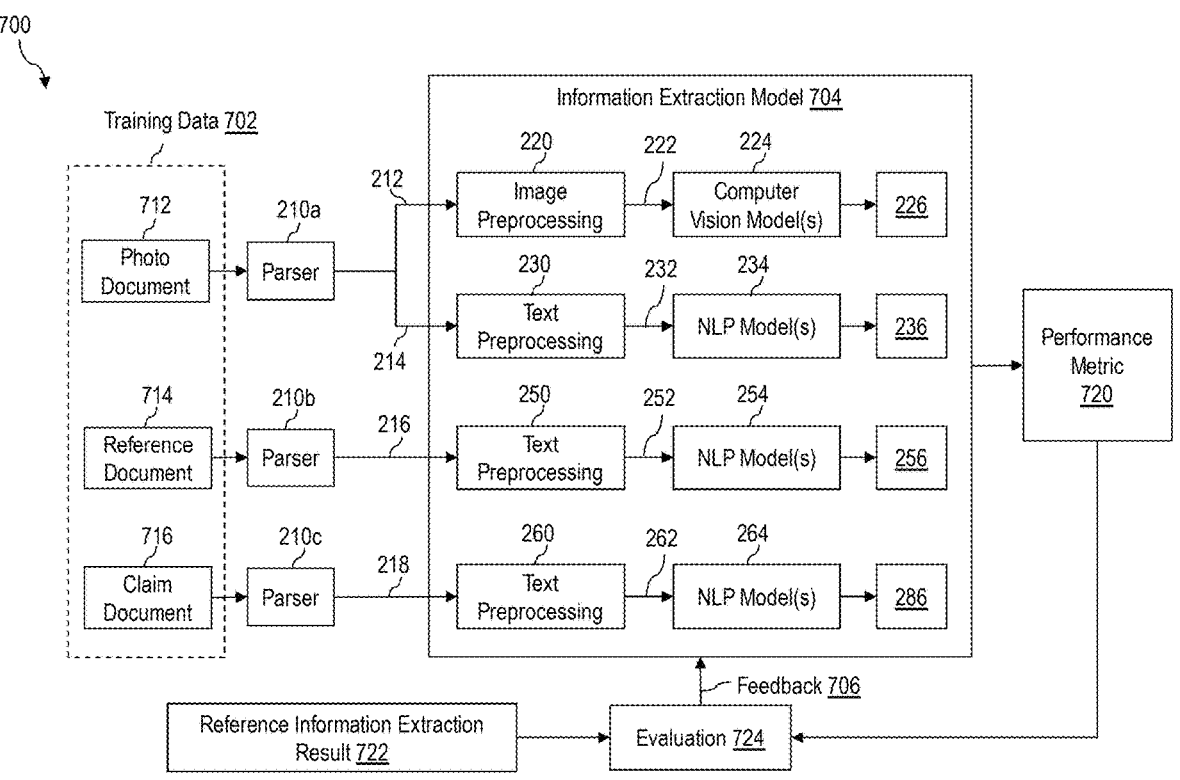
FIG. 7 is a block diagram illustrating an example process of training an information extraction model for AI-driven QA assessment according to an embodiment of the disclosure.

Turning now to FIG. 7, an example process 700 of training an information extraction model 704 for AI-driven QA assessment is described. The process 700 may be performed by the AI-based QA model trainer 154 to train various AI models 120 (e.g., the computer vision models 224, the NLP models 234, 254, 264) used in the processes 200, 300, and 400 discussed above with reference to FIGS. 2, 3, and 4, respectively. As shown in FIG. 7, the AI-based QA model trainer 154 may receive training data 702. The training data 702 may be substantially similar to the incoming claims data 110 shown in FIG. 1. In some instances, the training data 702 may include real claims data (e.g., the claims data 110) collected from claims for property damages in the real world. In some instances, the training data 702 may include synthetic claims data that are generated based on real claims data as will be discussed more fully below with reference to FIG. 9. The training data 702 may include claims data for a plurality of claims (e.g., each corresponding to a particular damaged property 102). For each claim, the training data 702 may include a set of data including a photo document 712, a reference document 714, and a claim document 716 for each claim. The photo document 712, the reference document 714, and the claim document 716 may be similar to the photo document 112, the reference document 114, and the claim document 116 discussed above, respectively.

As shown in FIG. 7, the information extraction model 704 may correspond to the AI-based analysis 202 discussed above. To train the information extraction model 704, the AI-based QA model trainer 154 may perform similar operations as the AI-based claims QA agent 152 discussed above with reference to FIGS. 2-4. For instance, the AI-based QA model trainer 154 may parse each of the photo document 712, the claim document 716, and the reference document 714 using a corresponding parser 210a, 210b, and 210c. The AI-based QA model trainer 154 may apply image preprocessing 220 and computer vision model(s) 224 to images (the image data 212) of the photo document 712 to extract first damage information 226 (e.g., a damage type, a damaged object, a material type, and/or a quantity of damaged objects). The AI-based QA model trainer 154 may apply text preprocessing 230 and NLP model(s) 234 to the notes or textual description (the text data 214) of the photo document 712 to extract second damage information 236 (e.g., a geographical location of the damage property 102, a damage type, a damaged object, a material type, and/or a quantity of damaged objects). The AI-based QA model trainer 154 may apply text preprocessing 250 and NLP model(s) 254 to the reference document 714 to extract contextual information 256 (e.g., policy, regulation, guideline, location specific to policy, regulation, guideline, and a summary of the claim). The AI-based QA model trainer 154 may apply text preprocessing 260 and NLP model(s) 264 to the claim document 716 to extract claim information 266 (e.g., a geographical location of the damage property 102, line items). For brevity, details of those operations are not repeated here and can be referred to the corresponding descriptions above.

The AI-based QA model trainer 154 may compute a performance metric 720 based on the first damage information 226, the second damage information 236, the contextual information 256, and the claim information 266. For instance, the performance metric 720 may include an indication of an inconsistency or a discrepancy between the images and the textual description of the claim in the photo document 712 based on a comparison of the first damage information 226 and the second damage information 236. Additionally or alternatively, the performance metric 720 may include an indication of an inconsistency or a discrepancy between the claim information 266 (from the claim document 716) and damage information (e.g., the third damage information 244) consolidated from the first damage information 226 and the second damage information 236 (from the photo document 712). Additionally or alternatively, the performance metric 720 may include an indication of an inconsistency or a discrepancy between the claim information 266 from the claim document 716 and the contextual information 256 from the reference document 714.

Next, the AI-based QA model trainer 154 may perform evaluation 724 based on the performance metric 720 output by the information extraction model 704 and a reference information extraction result 722. In an embodiment, the reference information extraction result 722 may be feedback from a human reviewer (e.g., the ground truth) based on the photo document 712, the reference document 714, and the claim document 716. The evaluation 724 may compare the performance metric 720 to the reference information extraction result 722 to generate feedback 706. The AI-based QA model trainer 154 may update the information extraction model 704 (e.g., causing one or more parameters of the computer vision model(s) 224, the NLP model(s) 234, 254, and 264 to be updated) based on the feedback 706. The training process 700 can be repeated until an error measure between the performance metric 720 and the reference information extraction result 722 computed by the evaluation 724 satisfies a threshold.

Figure 8:
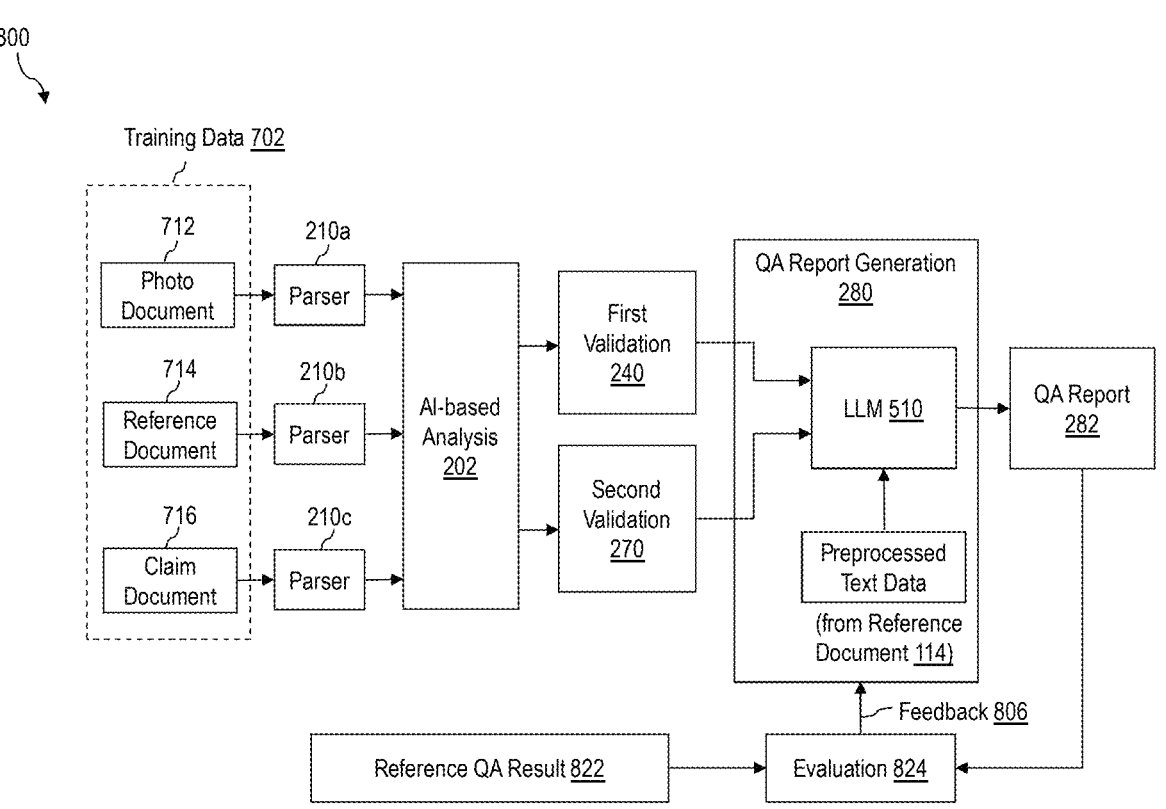
FIG. 8 is a block diagram illustrating an example process of training a large-language model (LLM) for QA report generation in AI-driven QA assessment according to an embodiment of the disclosure.

Turning now to FIG. 8, an example process 800 of training the LLM 510 (e.g., an AI model 120) for QA report generation in AI-driven QA assessment is described. The process 800 may be performed by the AI-based QA model trainer 154. As shown in FIG. 8, the AI-based QA model trainer 154 may implement the entire QA assessment chain as shown in FIG. 2 to generate a QA report. For brevity, details of those operations are not repeated here and can be referred to the corresponding descriptions above. The AI-based QA model trainer 154 may perform evaluation 824 to evaluate the QA report 282 against a reference QA result 822, which may be feedback of a human reviewer. As an example, the feedback 806 may indicate that the QA report 282 flagged an issue that is not present in the photo document 712, the reference document 714, or the claim document 716. As another example, the feedback 806 may indicate that QA report 282 recommended to correct an estimated cost that is incorrect. The AI-based QA model trainer 154 may provide, based on the evaluation 824, feedback 806 to the LLM 510. In this way, the LLM 510 may learn to recognize or detect certain issues in the photo document 712, the reference document 714, and the claim document 716, determine reasons for the detected issues, and/or determine corrective actions for the detected issues.

In some embodiments, during the deployment of the AI-based claims QA agent 152, a human reviewer may periodically audit the QA report 282 generated by the AI-based claims QA agent 152 and provide feedback to fine tune one or more of the computer vision model(s) 224, the NLP models 234, 254, and 264, the LLM 316 used for the first validation 240, the LLM 442 for the second validation 270, and/or the LLM 510 used for the QA report generation 280. In some instances, the human reviewer's feedback can be an agree indicator or a disagree indicator. In some instances, the human reviewer's feedback may also include more detailed information about why the human reviewer disagrees with the generated QA report 282. The training process 800 can be repeated until an error measure between the QA report 282 and the reference QA result 822 computed by the evaluation 824 satisfies a threshold.

Figure 9A:
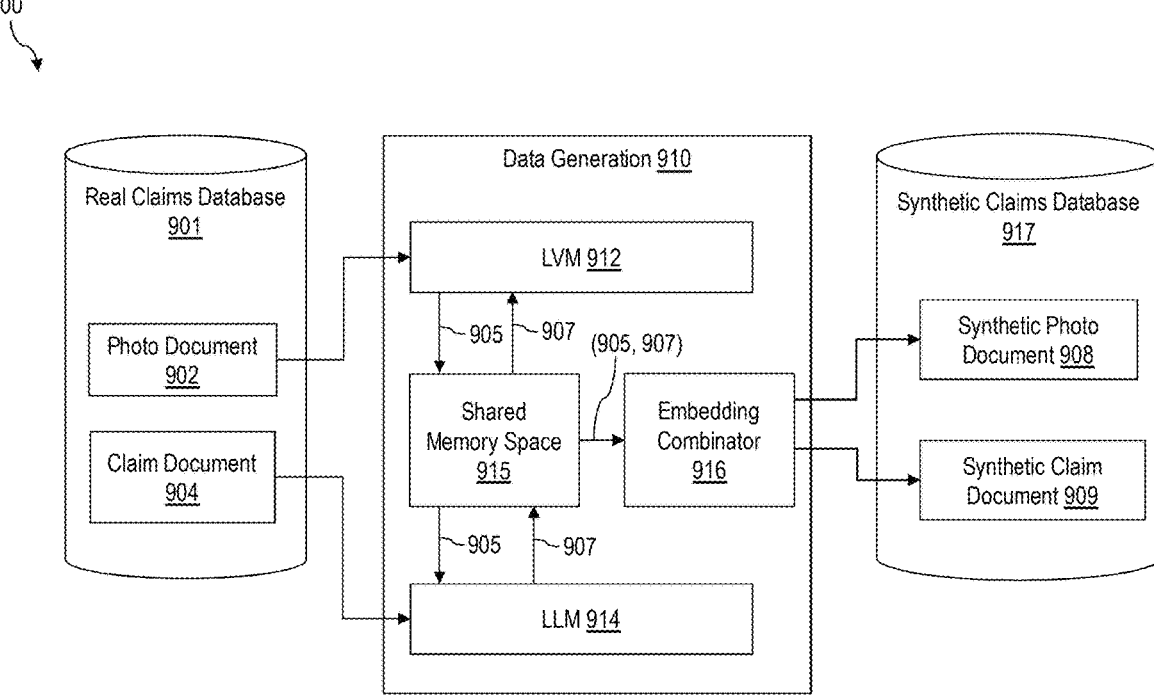
FIGS. 9A and 9B illustrate an example process of generating synthetic claims data for AI-driven QA assessment according to an embodiment of the disclosure.
Figure 9B:
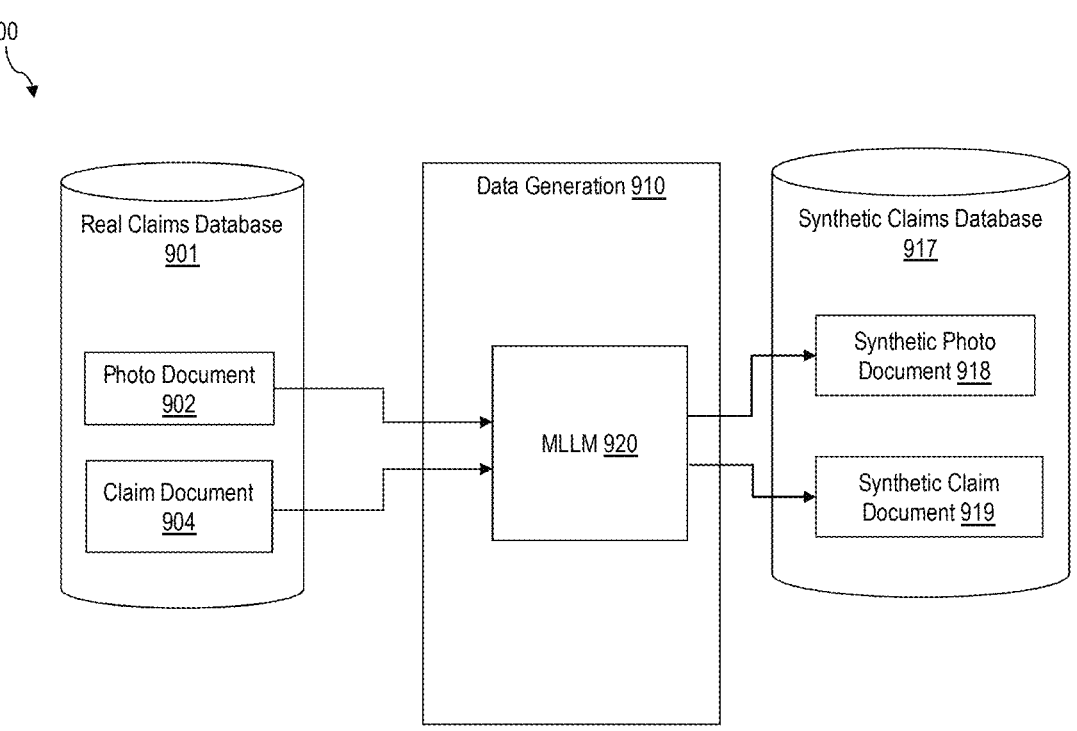

Turning now to FIGS. 9A and 9B, an example process 900 of generating synthetic claims data for AI-driven QA assessment is described. The process 900 may be implemented by the AI-based claims data generator 156. As discussed above, synthetic claims database 917 may simulate claims for extreme damage scenarios that are rare (e.g., caused by catastrophic events such as severe hurricanes or earthquakes) so that the AI models 120 (e.g., the computer vision model(s) 224, the NLP models 234, 254, and 264, the LLM 316 used for the first validation 240, the LLM 442 for the second validation 270, and/or the LLM 510 used for the QA report generation 280) may learn to analyze claims data for those rare damage scenarios. Further, the synthetic claims database 917 can increase the volume of claims data to be used for training to improve the accuracy of the AI models 120.

As shown, the AI-based claims data generator 156 may perform data generation 910 based on real claims database 901, for example, including photo document 902 and a corresponding claim document 904. The real claims database 901 may be actual claims data filed by actual policyholders (e.g., owners of properties in the real world). The photo document 902 may be similar to the photo document 112 discussed above. For instance, the photo document 902 may include image(s) (e.g., the image data 212) of realworld damaged properties 102 and corresponding textual description (e.g., the image text data 214) describing the damage in the respective image(s). The claim document 904 may be similar to the claim document 116 discussed above. For instance, the claim document 904 may include indication of a geographical location or area of the damaged property 102 and line items for restoring the damaged property 102. In some instances, the photo document 902 may be referred to as real photo document, and the claim document 904 may be referred to as real claim document, or generally refer to as real claims or real claim data.

As shown in FIG. 9A, the data generation 910 includes generating a synthetic photo document 908 and a corresponding synthetic claim document 909 based on the photo document 902 and the corresponding real claim document 904 using an LVM 912, an LLM 914, and an embedding combinator 916. In some instances, the synthetic photo document 908 and the synthetic claim document 909 may be generally referred to as synthetic claims or synthetic claims data. A coherent synthesis of the synthetic photo document 908 and the corresponding synthetic claim document 909 is enabled by establishing a shared understanding of the claim's essence between the LVM 912 and the LLM 914. This is achieved through specific designs of embeddings 905 and 907. The LVM 912 and the LLM 914 may be independently trained to generate embeddings 905 and 907, respectively, and jointly fine-tune after the independent training as will be discussed more fully below.

As part of the data generation 910 during an inference, the LVM 912 may process the image(s) and the corresponding text in the real photo document 902 to generate embeddings 905. The LVM 912 may share the embeddings 905 via a shared memory space 915. The LLM 914 may read the embeddings 905 and process the read embeddings 905 and the claim document 904 to generate embeddings 907. The LLM 914 may write the embeddings 907 to the shared memory space 915. The embedding combinator 916 may read embeddings 905 and 907 and use the combined information (the embeddings 905 and 907) to generate the synthetic photo document 908 and the corresponding synthetic claim document 909.

In an embodiment, the LVM 912 may include a convolutional neural network (CNN), a vision transformer (ViT), or any suitable deep learning network that extracts visual features from the images (the photos) of the real photo document 902 and creates embeddings for the visual features. The LVM 912 may further include a language model (e.g., bidirectional encoder representations from transformers (BERT)) that creates contextual embeddings for the descriptive text accompanying the images. The embeddings 905 generated by the LLM 914 is a multi-model representation including encoded visual features extracted from the images (photos) of the real photo document 902 and encoded textual features extracted from the text accompanying the images of the real photo document 902.

The embeddings 905 related to the visual features (generated by the LVM 912) may include object detection embeddings, scene context embeddings, and damage severity embeddings. The object detection embeddings include representations capturing the presence and location of relevant objects (e.g., damaged shingles, broken door, etc.). The object detection embeddings may be high-dimensional vectors that capture visual semantics. For instance, the object detection embeddings may include a vector representing the probability of various objects (e.g., damaged shingles, broken downsprout, etc.). An example object detection embedding vector may be in the form of [0.9 (long shingle), 0.2 (short shingle), 0.1 (shingle color), 0.05 (downsprout color), . . . ]. The objection detection embeddings may also encode spatial relationships, for example, including locations and relative positions of damaged objects. In some cases, the spatial relationships may be represented by a matrix or a set of vectors. The scene context embeddings include representations of the overall scene context (e.g., damaged property, flooded house, etc.). The damage severity embeddings include quantified embeddings indicating the extent of damage (e.g., minor shingle damage, major structural damage, etc.). The damage severity embeddings may be based on a combination of object detection and image segmentation. For instance, the damage severity embeddings may be represented by a vector indicating the extent of the damage (e.g., minor, moderate, severe). An example damage severity embedding vector may be in the form of [0.1 (minor), 0.7 (moderate), 0.2 (severe)].

The embeddings 905 related to the textual features (generated by the LVM 912) may include word embeddings representing standard words and/or sentence embeddings (e.g., BERT, Sentence-BERT, etc.) capturing the semantic meaning of the adjuster's notes (e.g., the accompanying text in the real photo document 902). In an example, embeddings of the visual features and the textual features are combined into a single richer combined embedding that comprehensively represents the information in the real photo document 902. In some examples, the combined embedding can be generated using techniques such as concatenation, attention mechanisms, and/or more sophisticated fusion methods.

The embeddings 907 generated by the LLM 914 may include claim summary embeddings. For instance, the LLM 914 may process the real claim document 904 to summarize the claim's narrative, for example, including the type of claim, estimated costs, and other key details. In an example, the embeddings 907 may include claim type information, for example, in the form of a vector indicating the type of claim (e.g., wind, hail, flood). An example claim type vector may be: [0.95 (wind), 0.05 (hail), 0 (flood)]. The embeddings 907 may also include encoded contextual embeddings that summarize the description of the damage, events, and other relevant information. The embeddings 907 may also include cost estimate embeddings, which may be numerical values representing repair or compensation costs. In some cases, the cost estimate embeddings may be in the form of a separate vector from the contextual embeddings. In other cases, the cost estimate embeddings may be integrated as part of the narrative claim summary (e.g., the contextual embeddings).

In some embodiments, the embedding 907 can optionally be sent back to the LVM 912 for semantic consistency check. This allows the LVM 912 to cross-reference the visual assessment with the narrative description. Discrepancies may trigger refinement or re-evaluation. For example, if the LVM 912 detects significant damage not reflected in the LLM 914's summary (generated from the real claim document 904), the LVM 912 may determine that there is a potential error or missing information in the embeddings 907 and trigger the LLM 914 (e.g., via the shared memory space 915) to refine the generation of the embeddings 907.

As discussed above, the embeddings 905 generated by the LVM 912 and the embeddings 907 generated by the LLM 914 are shared through the shared memory space 915. In an embodiment, the sharing of the embeddings 905 and 907 may be accomplished via message passing mechanisms. The shared memory space 915 may be a common storage area (e.g., a parameter server or a distributed database) that stores the embeddings 905 and 907. Both the LVM 912 and the LLM 914 may have read/write access to the shared memory space 915. The LVM 912 may send embeddings 905 as a message to the LLM 914. The LLM 914 may optionally send embeddings 907 as a response to the LVM 912. The message communications mechanisms may be handled by the underlying framework of the data generation 910.

The embedding combinator 916 may perform a fusion process to combine the embeddings 905 generated by the LVM 912 and the embeddings 907 generated by the LLM 914. Subsequently, the embedding combinator 916 may generate the synthetic photo document 908 and the corresponding synthetic claim document 909 based on the combined embeddings. The embedding combinator 916 may utilize various mechanisms (e.g., an MLLM, concatenation, and/or transformer architecture models) to combine the embeddings 905 and 907 to generate the synthetic photo document 908 and the corresponding synthetic claim document 909.

The training of the LVM 912 and the LLM 914 may be performed in two stages: an initial training stage and a joint fine-tuning stage. During the initial training state, the LVM 912 and the LLM 914 may be independently trained to generate embeddings 905 and 907. That is, there is no exchange of embeddings 905 and 907 between the LVM 912 and the LLM 914. The LVM 912 and the LLM 914 may be trained on large datasets of their respective modalities (images and text). During the joint fine-tuning stage, the LVM 912 and the LLM 914 are fine-tuned using a dataset of real claims. The training may utilize an objective function that encourages (or rewards) consistency between the LVM 912 generated embeddings 905 and the LLM 914 generated embeddings 907. The training may utilize a loss function that penalizes discrepancies between the LVM 912 generated embeddings 905 and the LLM 914 generated embeddings 907. As an example, the LVM 912 generated embeddings 905 may be a concatenated vector in the form of [0.9, 0.2, 0.1, 0.05, 0.1, 0.7, 0.2, 0.6, 0.2, 0.1, . . . (BERT embedding for text)] representing object detection probabilities, damage severity, and text embeddings. As an example, the LLM 914 generated embeddings 907 may be a vector in the form of [0.95, 0.05, 0, "shingles damage", 1500] representing claim type probabilities, textual summary, and cost estimate. The example embeddings provided above are for illustrative purposes. Real-world embeddings may have a higher dimension and may be more complex.

In an embodiment, the AI-based claims data generator 156 may further provide, to at least one of the LLM 914 or the LVM 912, feedback associated with an evaluation of the synthetic photo document 908 and the corresponding synthetic claim document 909 against a reference assessment (e.g., by a human reviewer) of the synthetic photo document 908 and the corresponding synthetic claim document 909.

The architecture used for the synthetic data generation 910 emphasizes joint learning rather than direct embedding exchange. The training process ensures both the LVM 912 and the LLM 914 learn to represent the same underlying information in compatible ways, enabling smooth communication and coherent synthetic data generation 910 during inference. The architecture is designed for scalability (e.g., to scale to millions of claims). Given pre-trained LVM 912 and LLM 914, the computational cost of generating individual synthetic claims is relatively low. The embedding sharing mechanism is efficient, and generating millions of claims can be parallelized across multiple GPUs or a distributed computing cluster. In summary, the shared embeddings create a link between the visual and textual aspects of a claim, ensuring the coherence and plausibility of the synthetic data generated. The architecture is highly scalable and can address the needs of generating a large volume of synthetic claims efficiently.

Additionally or alternatively, the data generation 910 includes an MLLM 920 as shown in FIG. 9B. Referring to FIG. 9B, the data generation 910 may generate a synthetic photo document 918 and a corresponding synthetic claim document 919 based on the photo document 902 and the corresponding real claim document 904 using the MLLM 920. In some instances, the synthetic photo document 918 and the synthetic claim document 919 may be generally referred to as synthetic claims or synthetic claims data. One challenge in using the MLLM 920 to generate the synthetic photo document 918 and the corresponding synthetic claim document 919 is creating a unified embedding that captures the semantic meaning from both images (from the photo document 902) and text (from the textual descriptions of the photo document 902 and the claim document 904).

In an embodiment, the MLLM 920 may include a CNN, a ViT, or any other suitable deep learning model to extract visual features from the images (of the photo document 902) for image encoding. The visual feature extraction may include identifying and quantifying features related to object detection, damage severity determination, and scene context determination. For instance, the object detection may include identifying damaged parts (e.g., "damaged shingles," "damaged downsprout"), which may be represented as probabilities and/or bounding boxes. The damage severity determination may include assessing the extent of damage (e.g., "minor damage," "major damage"), which may be represented by a categorical or numerical representation. The scene context determination may include understanding the environment (e.g., "rooftop," "yard"), which may be represented by categorical or embedding representations. The feature extraction may output high-dimensional vectors (the visual embedding) representing the abovementioned visual features.

In an embodiment, the MLLM 920 may further include a transformer-based language model (e.g., BERT, robustly optimized BER (ROBERTa), or any other suitable model) to process the descriptive text of the photo document 902 and the claim document 904. The transformer-based language model may capture semantic meaning, relationships between words, and the overall context to generate corresponding textual embeddings. For instance, each textual segment (e.g., sentence, paragraph) is converted into its corresponding textual embedding. The transformer-based language model may output high-dimensional vectors (textual embeddings) for each text segment (sentences, paragraphs). That is, the output may include contextualized embeddings.

Next, the visual and textual embeddings are then fused to create a single, comprehensive multimodal embedding. Multimodal fusion can be achieved using various techniques, such as concatenation, attention mechanisms, and/or late fusion. Concatenation may refer to concatenating the visual and textual embeddings. Concatenation is a simple approach but might not capture the relationships between the modalities effectively. Attention mechanisms may include weighing the importance of different parts of the visual and textual information. Attention mechanisms allows the model to focus on relevant visual features based on the textual context, and vice-versa. The attention mechanisms may be more effective or powerful in capturing relationships. Late fusion combines embeddings from different modalities at a later stage in the MLLM 920 architecture. Late fusion may include concatenating intermediate layers from the visual and textual processing branches. The multimodal fusion process may output a single, unified multimodal embedding representing the entire claim (e.g., including information from the photo document 902 and the claim document 904).

The MLLM 920 may further include a decoder. The multimodal embeddings may be fed to the MLLM 920's decoder. The decoder may utilize the multimodal embeddings as input to generate synthetic claims (e.g., the synthetic photo document 918 and the synthetic claim document 919). To generate the synthetic photo document 918, the decoder may use the multimodal embedding to produce a textual description of the damage (mimicking the adjuster's notes) along with generating the corresponding images. In some instances, the MLLM 920 may utilize generative adversarial networks (GANs) and/or diffusion models to perform image synthesis. The textual descriptions and images together constitute the synthetic photo document 918. To generate the synthetic claim document 919, the decoder may use the multimodal embeddings to generate a coherent, realistic claim document including claim narrative, damage details, and cost estimates.

The training of the MLLM 920 may involve a process that leverages the multimodal embeddings. The training of the MLLM 920 may include a pre-training stage and a fine-tuning stage. In the pre-training stage, the MLLM 920 may be pre-trained on a massive dataset of both images and text unrelated to insurance claims. The initial training of the MLLM 920 learns general representations of visual and textual information. The initial training may establish a strong foundation for the MLLM 920 to understand visual and linguistic structures.

In the fine-tuning stage, the pre-trained MLLM 920 is fine-tuned on a dataset of real claims. For instance, the MLLM 920 may generate synthetic claims from the combined multimodal embeddings created from the real claims (the real photo document 902 and the real claim document 904). The training may utilize a loss function to compare the synthetic outputs (the synthetic photo document 918 and the synthetic claim document 919) to the actual claim details (the real photo document 902 and the real claim document 904). The fine-tuning is a joint training process, shaping the MLLM 920 to learn a coherent representation of the data. The loss drives the MLLM 920 to learn to accurately reproduce the relationships between the different aspects of the claims. Stated differently, the loss function guides the training to generate synthetic claims that are close to the real data in terms of both visual appearance and textual content. In an example, a backpropagation algorithm may be used to adjust parameter(s) of the MLLM 920 to minimize this difference (e.g., error).

In an example, a visual embedding generated by the MLLM 920 may be in the form of [0.8 (rooftop), 0.6 (shingle), 0.2 (hail), 0.9 (moderate damage), 0.7 (fenced property)]. In an example, a textual embedding generated by the MLLM 920 may be a large vector from a BERT-like model representing the semantics of sentences like: "The rooftop shingle was damaged by hail in a fenced property. The estimate for repairs is $1,200." In an example, multimodal embedding generated by the MLLM 920 may be a concatenation of the visual and textual embedding vectors (or a more sophisticated fusion). These example embeddings are for illustrative purposes. Real-world embeddings may have a higher dimension and may be more complex. Sharing of encoded information is inherent in the MLLM 920's architecture. In an embodiment, the AI-based claims data generator 156 may further provide, to the MLLM 920, feedback associated with an evaluation of the synthetic photo document 918 and the corresponding synthetic claim document 919 against a reference assessment (e.g., by a human reviewer) of the synthetic photo document 918 and the corresponding synthetic claim document 919.

During inference (synthetic claim generation), the MLLM 920 uses the multimodal embedding derived from the input real claim's visual and textual data to generate a new synthetic claim. The embedding creation and usage are seamlessly integrated into the model's forward pass. In summary, the MLLM 920 is a multimodal model capable of understanding both image and text data. The creation of a combined embedding is helpful and advantageous for capturing the essence of the claim, which is used for generating synthetic claims. The training process fine-tunes the MLLM 920 to create realistic and coherent synthetic data.

In an embodiment, the AI-based claims data generator 156 may cross-check (or compare) the synthetic photo document 908 and the corresponding claim document 909 (e.g., referred to as first synthetic claim data) generated using the LVM 912, LLM 914, and the embedding combinator 916 (discussed above with reference to FIG. 9A) with the synthetic photo document 918 and the corresponding claim document 919 (e.g., referred to as second synthetic claim data) generated using the MLLM 920 (discussed above with reference to FIG. 9B). For instance, the AI-based claims data generator 156 may compute a difference metric between the first synthetic claim data and the second synthetic claim data. If the difference metric satisfies (or below) a certain threshold, the AI-based claims data generator 156 may store both the first synthetic claim data and the second synthetic claim data in the synthetic claims database 917. If the difference metric fails to satisfy the certain threshold, the AI-based claims data generator 156 may determine a performance metric (e.g., based on human feedback) for each of the first synthetic claims data and the second synthetic claims data. The AI-based claims data generator 156 may select the synthetic claims data with the higher performance metric (e.g., one of the first synthetic claims data or the second synthetic claims data) and store the selected synthetic claims data in the synthetic claims database 917. The AI-based claims data generator 156 may discard the one with the lower performance metric (e.g., the other one of first synthetic claims data or the second synthetic claims data). In some instances, the AI-based claims data generator 156 may use a similarity metric instead of a difference metric to compare the first synthetic claims data and the second synthetic claims data.

Figure 13:
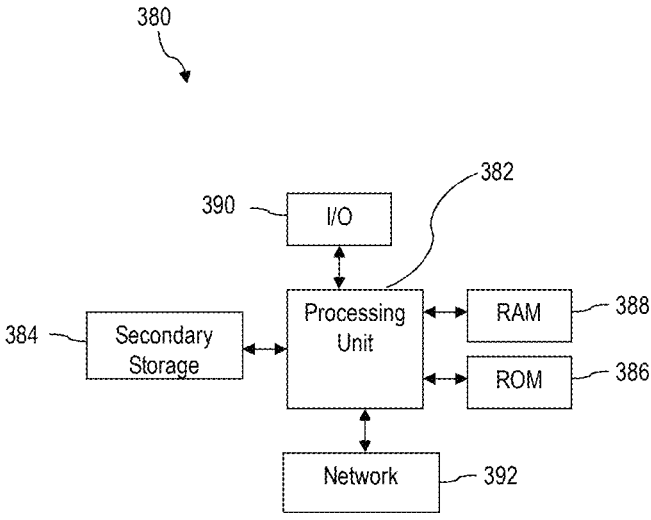
FIG. 13 is a block diagram of a computer system according to an embodiment of the disclosure.

Turning now to FIGS. 10A-10B, a method 1000 is described. In an embodiment, the method 1000 is a method for providing efficient, systematic AI-driven QA assessment on damage claims. The method 1000 may include similar mechanisms as discussed above with reference to FIGS. 1-6. The method 1000 may be implemented by the AI-based claims QA agent 152 including instructions stored in a non-transitory memory of a computer system 150 and executable by a processor of the computer system 150. In embodiments, the method 1000 may be implemented using a computer system with components as shown in FIG. 13. As illustrated, FIGS. 10A-10B include a number of enumerated operations, but embodiments of the operations in FIGS. 10A-10B may include additional operations before, after, and in between the enumerated operations. In some embodiments, one or more of the enumerated operations may be omitted or performed in a different order.

At block 1002, the AI-based claims QA agent 152 receives claims data 110 including a photo document 112, a claim document 116, and a reference document 114 associated with a damaged property 102. At block 1004, the AI-based claims QA agent 152 extracts one or more images (e.g., the image data 212) and a textual description (e.g., the textual data 214) of the damaged property 102 from the photo document 112. At block 1006, the AI-based claims QA agent 152 processes the one or more images using a computer vision model 224 to extract first damage information 226 associated with the damaged property 102. In an embodiment, the computer vision model 224 includes one or more AI models 120 (e.g., including at least one of an image segmentation model 304, a classification model 302, or an LVM). At block 1008, the AI-based claims QA agent 152 processes the textual description using a first NLP model 234 (e.g., a first ML model) to extract second damage information 236 associated with the damaged property 102. In an embodiment, the first damage information 226 extracted from the one or more images of the photo document 112 and the second damage information 236 extracted from the textual description of the photo document 112 are associated with at least one of a damage type, a damaged object, a quantity of damaged objects, or a material type associated with the damaged property 102.

At block 1010, the AI-based claims QA agent 152 validates an accuracy of the photo document 112 based on a consistency between the first damage information 226 and the second damage information 236 to generate a first consistency check result 242. In an embodiment, as part of validating the accuracy of the photo document 112, the AI-based claims QA agent 152 computes a similarity measure 312 between the first damage information 226 extracted from the one or more images of the photo document 112 and the second damage information 236 extracted from the textual description of the photo document 112. The AI-based claims QA agent 152 further compares the similarity measure 312 to a first threshold. In an embodiment, as part of validating the accuracy of the photo document 112, the AI-based claims QA agent 152 determines whether there is a pre-existing damage on the damaged property 102 based on a comparison of the one or more images against a geographical image database. In an embodiment, as part of validating the accuracy of the claim document 116, the AI-based claims QA agent 152 determines whether an individual one of the one or more line items is excluded from coverage based on the policy in the contextual information 256. In an embodiment, as part of validating the accuracy of the claim document 116, the AI-based claims QA agent 152 determines whether an estimated cost in an individual one of the one or more line items is inaccurate based on the contextual information 256 and a policy list database 122 including price codes.

In an embodiment, as part of validating the accuracy of the photo document 112, the AI-based claims QA agent 152 initiates an LLM 316 to generate the first consistency check result 242 based on the first damage information 226 extracted from the one or more images of the photo document 112, the second damage information 236 extracted from the textual description of the photo document 112, and the photo document 112. The AI-based claims QA agent 152 further receives, from the LLM 316, the first consistency check result 242 including at least one of (1) a textual description of at least one of an approval or a discrepancy between the one or more images and the textual description of the photo document 112, or (2) an annotated photo document (e.g., at least a portion of the photo document 112 with annotations) highlighting a discrepancy.

At block 1012, the AI-based claims QA agent 152 combines the first damage information 226 and the second damage information 236 into third damage information 244.

At block 1014, the AI-based claims QA agent 152 processes the claim document 116 using a second NLP model 264 (e.g., a second ML model) to extract claim information 266 associated with the damaged property 102. The claim information 266 includes a geographical location of the damaged property 102 and one or more line items associated with restoring the damaged property 102. In an embodiment, an individual one of the one or more line items in the claim information 266 extracted from the claim document 116 includes at least one of a service category, a description, a unit price, or a quantity. At block 1016, the AI-based claims QA agent 152 processes the reference document 114 using a third NLP model 254 (e.g., a third ML model) to extract contextual information 256 associated with at least one of a policy, a regulation, or a guideline associated with a specific geographical location. In an embodiment, at least one of the first NLP model 234, the second NLP model 254, or the third NLP model 264 used respectively for processing the textual description of the photo document 112, the claim document 116, or the reference document 114 includes at least one of an NER model 306, 404, or 406, or an LLM.

At block 1018, the AI-based claims QA agent 152 validates an accuracy of the claim document 116 based on a consistency of the claim information 266 against the contextual information 256, and the combined or consolidated third damage information 244 to generate a second consistency check result 272. In an embodiment, as part of validating the accuracy of the claim document 116, the AI-based claims QA agent 152 computes a similarity measure 432 between (1) the claim information extracted from the claim document 116, and (2) the contextual information extracted from the reference document 114 and the combined third damage information 244 from the photo document 112. The AI-based claims QA agent 152 further compares the similarity measure 432 to a threshold. As discussed above, a claim for a certain damaged property may be processed in multiple stages at different times and/or by different adjusters. Accordingly, in an embodiment, as part of validating the accuracy of the claim document 116, the AI-based claims QA agent 152 computes a similarity measure 412 between previously processed claims data 126 associated with the damaged property 102 and the claim information 266 extracted from the claim document 116. The AI-based claims QA agent 152 further compares the similarity measure 412 to a threshold.

In an embodiment, as part of validating the accuracy of the claim document 116, the AI-based claims QA agent 152 initiates an LLM 442 to generate the second consistency check result 272 based on the combined third damage information 244 from the photo document 112, the claim information 266 extracted from the claim document 116, the contextual information 256 extracted from the reference document 114, the photo document 112, the claim document 116, and the reference document 114. In response, the AI-based claims QA agent 152 receives, from the LLM 442, the second consistency check result 272 that includes at least one of a textual description of at least one of (1) an approval or a discrepancy among the photo document 112, the claim document 116, and the reference document 114, (2) an annotated photo document (e.g., at least a portion of the photo document 112 with annotations) highlighting a first discrepancy, an annotated reference document (e.g., at least a portion of the reference document 114 with annotations) highlighting a second discrepancy, or an annotated claim document (e.g., at least a portion of the claim document 116 with annotations) highlighting a third discrepancy.

At block 1020, the AI-based claims QA agent 152 initiates an LLM 510 to generate, based on the first consistency check result 242, the second consistency check result 272, and the reference document 114, a QA report 282 for the claims data 110. At block 1022, the AI-based claims QA agent 152 receives, from the LLM 510, the QA report 282 indicating an issue in at least one of the photo document 112, the claim document 116, or the reference document 114. In an embodiment, as part of initiating the LLM 510 to generate the QA report 282 for the claims data 110, the AI-based claims QA agent 152 provides, to the LLM 510, the contextual information 256 extracted from the reference document 114, the first consistency check result 242, the second consistency check result 272, and an input prompt to check for a recent policy change. At block 1024, the AI-based claims QA agent 152 initiates, based on the QA report 282, updating the at least one of the photo document 112, the claim document 116, or the reference document 114 to correct the issue. In some instances, as part of the initiating, the AI-based claims QA agent 152 may notify an adjuster or a human reviewer to perform the update. In other instances, as part of the initiating, the AI-based claims QA agent 152 performs the update.

In an embodiment, the AI-based claims QA agent 152 further preprocesses the one or more images of the photo document 112 before processing the one or more images using the computer vision model 224 at block 1006. In some instances, the preprocessing may include at least resolution enhancement. In an embodiment, the AI-based claims QA agent 152 further applies textual-based and linguistic-based preprocessing to the textual description of the photo document 112, textual data 216 of the reference document 114, and/or the textual data 218 of the claim document 116 before respective processing at blocks 1008, 1014, and/or 1016. In some instances, the textual-based and linguistic-based preprocessing may include at least one of a handwritten recognition enhancement or a contextual enhancement.

Turning now to FIGS. 11A-11B, a method 1100 is described. In an embodiment, the method 1100 is a method for training an AI-driven QA model for validating data across different sources. The method 1100 may include similar mechanisms as discussed above with reference to FIGS. 1-8 and 10A-10B. The method 1100 may be implemented by the AI-based QA model trainer 154 including instructions stored in a non-transitory memory of a computer system 150 and executable by a processor of the computer system 150. In embodiments, the method 1100 may be implemented using a computer system 150 with components as shown in FIG. 13. As illustrated, FIGS. 11A-11B include a number of enumerated operations, but embodiments of the operations in FIGS. 11A-11B may include additional operations before, after, and in between the enumerated operations. In some embodiments, one or more of the enumerated operations may be omitted or performed in a different order.

At block 1102, the AI-based QA model trainer 154 receives training data 702 including a photo document 712, a claim document 716, and a reference document 714 associated with a damaged property 102. In an embodiment, the training data 702 may be real claims data 110 and/or 901 captured from a real world. In an embodiment, the training data 702 may be a synthetic claims database 917 generated based on real claims data 110 and/or 901 captured from a real world. At block 1104, the AI-based QA model trainer 154 extracts one or more images (e.g., the image data 212) and a textual description (e.g., the textual data 214) of the damaged property 102 from the photo document 712. At block 1106, the AI-based QA model trainer 154 processes the one or more images using a computer vision model 224 to extract first damage information 226 associated with the damaged property 102. In an embodiment, the computer vision model 224 includes one or more AI models 120 (e.g., including at least one of an image segmentation model 304, a classification model 302, or an LVM). At block 1108, the AI-based QA model trainer 154 processes the textual description using a first NLP model 234 (e.g., a first ML model) to extract second damage information 236 associated with the damaged property 102. In an embodiment, the first damage information 226 extracted from the one or more images of the photo document 712 and the second damage information 236 extracted from the textual description of the photo document 712 are associated with at least one of a damage type, a damaged object, a quantity of damaged objects, or a material type associated with the damaged property 102.

At block 1110, the AI-based QA model trainer 154 validates an accuracy of the photo document 712 based on a consistency between the first damage information 226 and the second damage information 236 to generate a first consistency check result 242 (e.g., using substantially similar operations as discussed above at block 1010). At block

1112, the AI-based QA model trainer 154 combines or consolidates the first damage information 226 and the second damage information 236 into third damage information 244.

At block 1114, the AI-based QA model trainer 154 processes the claim document 716 using a second NLP model 264 (e.g., a second ML model) to extract claim information 266 associated with the damaged property 102. The claim information 266 includes a geographical location of the damaged property 102 and one or more line items associated with restoring the damaged property 102. At block 1116, the AI-based QA model trainer 154 processes the reference document 714 using a third NLP model 254 (e.g., a third ML model) to extract contextual information 256 associated with at least one of a policy, a regulation, or a guideline associated with a specific geographical location. At block 1118, the AI-based QA model trainer 154 validates an accuracy of the claim document 716 based on a consistency of the claim information 266 against the contextual information 256, and the combined or consolidated third damage information 244 to generate a second consistency check result 272 (e.g., using substantially similar operations as discussed above at block 1018).

At block 1120, the AI-based QA model trainer 154 initiates an LLM 510 to generate, based on the first consistency check result 242, the second consistency check result 272, and the reference document 714, a QA report 282 for the training data 702. At block 1122, the AI-based QA model trainer 154 receives, from the LLM 510, the QA report 282 indicating an issue in at least one of the photo document 712, the claim document 716, or the reference document 714 (e.g., using substantially similar operations as discussed above at block 1022).

At block 1124, the AI-based QA model trainer 154 evaluates at least one of the extracted first damage information 226, the extracted second damage information 236, the extracted claim information 266, the extracted contextual information 256, or the QA report 282 against reference assessment information. In an embodiment, the reference assessment is based on human feedback (e.g., by a human reviewer). At block 1126, the AI-based QA model trainer 154 causes, based on the evaluating, an update of one or more parameters (e.g., internal model parameters) associated with at least one of the computer vision model 224, the first NLP model 234, the second NLP model 264, the third NLP model 254, or the LLM 510.

In an embodiment, the evaluating at block 1124 includes evaluating the first damage information 226 against the reference assessment information (e.g., the reference information extraction result 722) and the causing the update of the one or more parameters at block 1126 includes causing an update of a parameter of the computer vision model 224. In an embodiment, the evaluating at block 1124 includes evaluating the second damage information 236 against the reference assessment information (e.g., the reference information extraction result 722) and the causing the update of the one or more parameters at block 1126 includes causing an update of a parameter of the first NLP model 234. In an embodiment, the evaluating at block 1124 includes evaluating the claim information 266 against the reference assessment information (e.g., the reference information extraction result 722) and the causing the update of the one or more parameters at block 1126 includes causing an update of a parameter of the second NLP model 264. In an embodiment, the evaluating at block 1124 includes evaluating the contextual information 256 against the reference assessment information (e.g., the reference information extraction result 722) and the causing the update of the one or more parameters at block 1126 includes causing an update of a parameter of the third NLP model 254. In an embodiment, the evaluating at block 1124 includes evaluating the QA report 282 against the reference assessment information (e.g., the reference QA result 822) and the causing the update of the one or more parameters at block 1126 includes causing an update of a parameter of the LLM 510.

Turning now to FIG. 12, a method 1200 is described. In an embodiment, the method 1200 is a method for generating synthetic claims data for training AI models 120 to perform consistency check (e.g., QA) across different documents (e.g., the photo document 112 and the claim document 116). The method 1200 may include similar mechanisms as discussed above with reference to FIGS. 1-6 and 9A-9B. The method 1200 may be implemented by the AI-based claims data generator 156 including instructions stored in a non-transitory memory of a computer system 150 and executable by a processor of the computer system 150. In embodiments, the method 1200 may be implemented using a computer system with components as shown in FIG. 13. As illustrated, FIG. 12 includes a number of enumerated operations, but embodiments of the operations in FIG. 12 may include additional operations before, after, and in between the enumerated operations. In some embodiments, one or more of the enumerated operations may be omitted or performed in a different order.

At block 1202, the AI-based claims data generator 156 processes a real photo document 902 including a real image of a first damaged property (e.g., the property 102) and a textual description associated with the image to generate visual embeddings corresponding to the real image using a first ML model. In an embodiment, the visual embeddings include at least one of an object embedding associated with one or more damaged objects of the first damaged property, a spatial embedding associated with location information of one or more damaged objects of the first damaged property, a scene context embedding associated with a damage type of the first damaged property, or a damage severity embedding associated with a damage extent of the first damaged property.

At block 1204, the AI-based claims data generator 156 processes the real photo document 902 to generate first textual embeddings corresponding to the textual description associated with the image using a second ML model.

At block 1206, the AI-based claims data generator 156 processes a real claim document 904 including real claim information (e.g., including claim type, location, line items, etc.) associated with the first damaged property to generate second textual embeddings corresponding to a summary of the claim information using a third ML model. In an embodiment, the second textual embeddings include at least one of a claim type embedding associated with a damage type (e.g., flood, hail, etc.) of the first damaged property or a cost embedding associated with a cost for repairing the first damaged property.

At block 1208, the AI-based claims data generator 156 combines the visual embeddings, the first textual embeddings, and the second textual embeddings to generate combined embeddings.

At block 1210, the AI-based claims data generator 156 generates a synthetic photo document and a synthetic claim document (e.g., the synthetic photo document 908 and the corresponding synthetic claim document 909 of FIG. 9A or the synthetic photo document 908 and the corresponding synthetic claim document 909 of FIG. 9B) based on the combined embeddings using a fourth ML model. The synthetic photo document includes a synthetic image of a second damaged property and a textual description associated with the synthetic image. The synthetic claim document includes synthetic claim information associated with the second damaged property.

In an embodiment, the first ML model used for generating the visual embeddings (e.g., the embeddings 905) corresponding to the real image of the first damaged property at block 1202 and the second ML model used for generating the first textual embeddings (e.g., the embeddings 905) corresponding to the textual description associated with the real image at block 1204 correspond to an LVM 912. Further, the third ML model used for generating the second textual embeddings (e.g., the embeddings 907) corresponding to the summary of the real claim information at block 1206 corresponds to an LLM 914. In an embodiment, as part of processing the real claim document 904 to generate the second textual embeddings at block 1206, the LLM 914 generates the second textual embeddings further based on the visual embeddings and the first textual embeddings (e.g., the embeddings 905) generated by the LVM 912. In an embodiment, the LLM 914 and the LVM 912 are trained to generate consistent embeddings associated with damaged properties.

In an embodiment, the first ML model used for generating the visual embeddings corresponding to the real image of the first damaged property at block 1202 corresponds to a vision encoder of an MLLM 920. Further, the second ML model used for generating the first textual embeddings corresponding to the textual description associated with the real image at block 1204 and the third ML model used for generating the second textual embeddings corresponding to the summary of the real claim information at block 1206 corresponds to a transformer-based language model of the MLLM 920.

In an embodiment, as part of generating the synthetic photo document and the synthetic claim document at block 1210, the AI-based claims data generator 156 generates the synthetic photo document (e.g., the synthetic photo document 908 or 918) using a generative model (e.g., of the MLLM 920) based on the combined embedding and generates the synthetic claim document (e.g., the synthetic claim document 909 or 919) using a transformer-based language model (e.g., of the MLLM 920) based on the combined embeddings.

Subsequently, the AI-based claims data generator 156 may store the generated synthetic photo document and the synthetic claim document in the synthetic claims database 917. The synthetic claims database 917 (e.g., including the synthetic photo document 908 and the corresponding synthetic claim document 909 or the synthetic photo document 918 and the corresponding synthetic claim document 919) can be used for training any one of the computer vision models 224, the NLP models 234, 254, and 264, the LLMs 316, 442, and 510, and the training of the AI model 120 may be as discussed above with reference to FIGS. 7-8 and 11A-11B. Generally, the AI models 120 may be trained using a real claims database 901, a synthetic claims database 917, or a combination thereof.

FIG. 13 illustrates a computer system 380 suitable for implementing one or more embodiments disclosed herein. The computer system 380 includes processing unit 382 (which may include one or more processors, e.g., central processor units (CPUs) and/or one or more graphics processing units (GPUs)) that is in communication with memory devices including secondary storage 384, read only memory (ROM) 386, RAM 388, input/output (I/O) devices 390, and network connectivity devices 392. The processor 382 may be implemented as one or more CPU chips and/or one or more GPU chips.

It is understood that by programming and/or loading executable instructions onto the computer system 380, at least one of the processing unit 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the processing unit 382 may execute a computer program or application. For example, the processing unit 382 may execute software or firmware stored in the ROM 386 or stored in the RAM 388. In some cases, on boot and/or when the application is initiated, the processing unit 382 may copy the application or portions of the application from the secondary storage 384 to the RAM 388 or to memory space within the processing unit 382 itself, and the processing unit 382 may then execute instructions that the application is comprised of. In some cases, the processing unit 382 may copy the application or portions of the application from memory accessed via the network connectivity devices 392 or via the I/O devices 390 to the RAM 388 or to memory space within the processing unit 382, and the processing unit 382 may then execute instructions that the application is comprised of. During execution, an application may load instructions into the processing unit 382, for example load some of the instructions of the application into a cache of the processing unit 382. In some contexts, an application that is executed may be said to configure the processing unit 382 to do something, e.g., to configure the processing unit 382 to perform the function or functions promoted by the subject application. When the processing unit 382 is configured in this way by the application, the processing unit 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, USB interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, global system for mobile communications (GSM), LTE, WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processing unit 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processing unit 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. In some cases, the processing unit 382 may multiple processors (e.g., CPUs and/or GPUs). Thus, while instructions may be discussed as executed by a processing unit, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

ADDITIONAL EMBODIMENTS

The following are non-limiting, specific embodiments in accordance with the present disclosure.

A first embodiment which is a computer-implemented method of analyzing and validating a consistency across documents including images and language data from different data sources using artificial intelligence (AI). The method includes receiving, by an application including instructions stored in non-transitory memory of a computer system and executable by a processor of the computer system, a first document, a second document, and a third document associated with a damaged property and associated with different data sources; extracting, by the application, one or more images and a textual description of the damaged property from the first document; processing, by the application, the one or more images using a computer vision model to extract first damage information associated with the damaged property; processing, by the application, the textual description using a first machine learning (ML) model to extract second damage information associated with the damaged property; validating, by the application, an accuracy of the first document based on a consistency between the first damage information and the second damage information to generate a first consistency check result; combining, by the application, the first damage information and the second damage information into third damage information; processing, by the application, the second document using a second ML model to extract claim information associated with the damaged property; processing, by the application, the third document using a third ML model to extract contextual information; validating, by the application, an accuracy of the second document based on a consistency of the claim information against the contextual information, and the third damage information to generate a second consistency check result; initiating, by the application, a large-language model (LLM) to generate, based on the first consistency check result, the second consistency check result, and the third document, a report for the received first, second, and third documents; receiving, by the application, from the LLM, the report indicating an issue in at least one of the first document, the second document, or the third document; and initiating, by the application, based on the report, updating the at least one of the first document, the second document, or the third document to correct the issue.

A second embodiment, which is the method of the first embodiment, wherein the claim information comprises a geographical location of the damaged property and one or more line items associated with restoring the damaged property.

A third embodiment, which is the method of the first embodiment, wherein the contextual information is associated with at least one of a policy, a regulation, or a guideline associated with a specific geographical location.

A fourth embodiment, which is the method of the first embodiment, wherein the validating the accuracy of the first document is based on a similarity measure between the first damage information extracted from the one or more images of the first document and the second damage information extracted from the textual description of the first document.

A fifth embodiment, which is the method of the first embodiment, wherein the validating the accuracy of the second document is based on a similarity measure between (1) the claim information extracted from the second document, and (2) the contextual information extracted from the third document and the third damage information from the first document.

A sixth embodiment which is a computer-implemented method of analyzing images and language data in multiple documents iteratively to generate an integrated result using artificial intelligence (AI). The method comprises receiving, by an application including instructions stored in non-transitory memory of a computer system and executable by a processor of the computer system, a plurality of documents, each including at least one of an image or textual data associated with a particular context; processing, by the application, a first document of the plurality of documents using a first machine learning (ML) model to extract, first information associated with the particular context from at least one of a respective image or respective textual data of the first document; analyzing, by the application, each of the other documents of the plurality of documents to validate a consistency across the plurality of documents to generate a plurality of consistency check results, wherein the analyzing comprises processing, by the application, an individual document of the other documents using a second ML model to extract, second information associated with the particular context from at least one of a respective image or respective textual data of the respective document; and validating, by the application, a consistency of the second information of the individual document against the first information of the first document to generate a respective one of the plurality of consistency check results; initiating, by the application, a large-language model (LLM) to generate, based on the plurality of consistency check results, an integrate result associated with a consistency across the plurality of documents; and receiving, by the application, from the LLM, the integrated result indicating a discrepancy in one or more documents of the plurality of documents.

A seventh embodiment, which is the method of the sixth embodiment, wherein the processing the individual document comprises processing, by the application, the individual document using a third ML model to extract, third information associated with the particular context from the respective image of the individual document; and processing, by the application, the individual document using a fourth ML model to extract, fourth information associated with the particular context from the respective textual data of the individual document, the second information comprises the third information and the fourth information, and the analyzing further comprises validating, by the application, a consistency between the third information and the fourth information to generate a respective one of the plurality of consistency check results.

An eighth embodiment, which is the method of the seventh embodiment, wherein the third ML model corresponds to a computer vision model, and wherein the fourth ML model corresponds to a natural language processing (NLP) model.

A ninth embodiment, which is the method of the sixth embodiment, wherein the validating the consistency of the second information of the individual document against the first information of the first document is further based on a contextual similarity measure.

What is claimed is:
1. A computer-implemented method for providing efficient, systematic artificial intelligence (AI)-driven quality assurance (QA) assessment on damage claims based on an analysis and multiple consistency checks across claims data from different processing stages and against relevant policy, regulation, and guideline information, the method comprising:

receiving, by an AI-based claims QA agent including instructions stored in non-transitory memory of a computer system and executable by a processor of the computer system, claims data comprising a photo document, a claim document, and a reference document associated with a damaged property;

extracting, by the AI-based claims QA agent, one or more images and a textual description of the damaged property from the photo document;

processing, by the AI-based claims QA agent, the one or more images using a computer vision model to extract first damage information associated with the damaged property;

processing, by the AI-based claims QA agent, the textual description using a first machine learning (ML) model to extract second damage information associated with the damaged property;

validating, by the AI-based claims QA agent, an accuracy of the photo document based on a consistency between the first damage information and the second damage information to generate a first consistency check result;

combining, by the AI-based claims QA agent, the first damage information and the second damage information into third damage information;

processing, by the AI-based claims QA agent, the claim document using a second ML model to extract claim information associated with the damaged property, wherein the claim information comprises a geographical location of the damaged property and one or more line items associated with restoring the damaged property;

processing, by the AI-based claims QA agent, the reference document using a third ML model to extract contextual information associated with at least one of a policy, a regulation, or a guideline associated with a specific geographical location;

validating, by the AI-based claims QA agent, an accuracy of the claim document based on a consistency of the claim information against the contextual information, and the combined third damage information to generate a second consistency check result;

initiating, by the AI-based claims QA agent, a large-language model (LLM) to generate, based on the first consistency check result, the second consistency check result, and the reference document, a QA report for the claims data;

receiving, by the AI-based claims QA agent, from the LLM, the QA report indicating an issue in at least one of the photo document, the claim document, or the reference document; and initiating, by the AI-based claims QA agent, based on the QA report, updating the at least one of the photo document, the claim document, or the reference document to correct the issue.

2. The method of claim 1, wherein the first damage information extracted from the one or more images of the photo document and the second damage information extracted from the textual description of the photo document are associated with at least one of a damage type, a damaged object, a quantity of damaged objects, or a material type associated with the damaged property.

3. The method of claim 1, wherein an individual one of the one or more line items in the claim information extracted from the claim document comprises at least one of a service category, a description, a unit price, or a quantity.

4. The method of claim 1, wherein the validating the accuracy of the photo document comprises:

computing, by the AI-based claims QA agent, a similarity measure between the first damage information extracted from the one or more images of the photo document and the second damage information extracted from the textual description of the photo document; and comparing, by the AI-based claims QA agent, the similarity measure to a threshold.

5. The method of claim 1, wherein the validating the accuracy of the claim document comprises:

computing a similarity measure between:

(1) the claim information extracted from the claim document, and (2) the contextual information extracted from the reference document and the combined third damage information from the photo document; and comparing, by the AI-based claims QA agent, the similarity measure to a threshold.

6. The method of claim 1, wherein the validating the accuracy of the claim document comprises:

computing a similarity measure between previously processed claims data associated with the damaged property and the claim information extracted from the claim document; and comparing, by the AI-based claims QA agent, the similarity measure to a threshold.

7. The method of claim 1, wherein the validating the accuracy of the photo document comprises:

initiating, by the AI-based claims QA agent, a second LLM to generate the first consistency check result based on the first damage information extracted from the one or more images of the photo document, the second damage information extracted from the textual description of the photo document, and the photo document; and receiving, by the AI-based claims QA agent, from the second LLM, the first consistency check result comprising at least one of:

a textual description of at least one of an approval or a discrepancy between the one or more images and the textual description of the photo document, or an annotated photo document highlighting a discrepancy.

8. The method of claim 1, wherein the validating the accuracy of the claim document comprises:

initiating, by the AI-based claims QA agent, a second LLM to generate the second consistency check result based on the combined third damage information from the photo document, the claim information extracted from the claim document, the contextual information extracted from the reference document, the photo document, the claim document, and the reference document; and receiving, by the AI-based claims QA agent, from the second LLM, the second consistency check result comprising at least one of:

a textual description of at least one of an approval or a discrepancy among the photo document, the claim document, and the reference document, an annotated photo document highlighting a first discrepancy, an annotated reference document highlighting a second discrepancy, or an annotated claim document highlighting a third discrepancy.

9. The method of claim 1, wherein the validating the accuracy of the photo document further comprises:

determining, by the AI-based claims QA agent, whether there is pre-existing damage on the damaged property based on a comparison of the one or more images against a geographical image database.

10. The method of claim 1, wherein the validating the accuracy of the claim document further comprises one or more of:

determining, by the AI-based claims QA agent, whether an individual one of the one or more line items is excluded from coverage based on the policy; or determining, by the AI-based claims QA agent, whether an estimated cost in an individual one of the one or more line items is inaccurate based on the contextual information and a policy list database comprising price codes.

11. The method of claim 1, wherein the initiating the LLM to generate the QA report for the claims data comprises:

providing, by the AI-based claims QA agent, to the LLM, the contextual information extracted from the reference document, the first consistency check result, the second consistency check result, and an input prompt to check for a recent policy change.

12. The method of claim 1, wherein the computer vision model used for processing the one or more images to extract the first damage information associated with the damaged property comprises at least one of an image segmentation model, a classification model, or a large-vision model (LVM).

13. The method of claim 1, wherein at least one of the first ML model, the second ML model, or the third ML model used respectively for processing the textual description of the photo document, the claim document, or the reference document comprises at least one of a name property recognition (NER) model or an LLM.

14. The method of claim 1, further comprising one or more of:

preprocessing, by the AI-based claims QA agent, the one or more images of the photo document before processing the one or more images using the computer vision model, wherein the preprocessing comprises at least resolution enhancement; or preprocessing, by the AI-based claims QA agent, the textual description of the photo document before processing the textual description using the first ML model, wherein the preprocessing comprises at least one of a handwritten recognition enhancement or a contextual enhancement.

* * * * *